(12) United States Patent
Vasilovich et al.

(10) Patent No.: US 7,253,534 B2
(45) Date of Patent: Aug. 7, 2007

(54) METHOD AND APPARATUS FOR CONVERTING HUMAN POWER TO ELECTRICAL POWER

(75) Inventors: Linda A. Vasilovich, 641 N. Lima St., Burbank, CA (US) 91505; Guy W. Vasilovich, Burbank, CA (US); Richard K. Hilgner, Burbank, CA (US)

(73) Assignee: Linda A. Vasilovich, Burbank, CA (US)

( * ) Notice: Subject to any disclaimer, the term of this patent is extended or adjusted under 35 U.S.C. 154(b) by 48 days.

(21) Appl. No.: 11/060,992

(22) Filed: Feb. 18, 2005

(65) Prior Publication Data

US 2005/0200221 A1 Sep. 15, 2005

Related U.S. Application Data

(60) Provisional application No. 60/545,383, filed on Feb. 18, 2004.

(51) Int. Cl.
*F02B 63/04* (2006.01)
*F03G 7/08* (2006.01)
*H02K 7/10* (2006.01)
*H02K 7/18* (2006.01)

(52) U.S. Cl. ............... 290/1 R; 290/1 C; 310/67 A; 310/75 B

(58) Field of Classification Search ............... 290/1 R, 290/1 A, 1 C; 310/67 A, 68 A, 75 B, 75 D, 310/74, 83; 322/4
See application file for complete search history.

(56) References Cited

U.S. PATENT DOCUMENTS 3,240,947 A * 3/1966 Mas ........................... 290/50
3,296,451 A * 1/1967 Van Ausdal et al. ........ 290/4 R
3,705,721 A * 12/1972 Lulay et al. .................... 482/2
3,765,245 A    10/1973 Hampi
3,831,942 A *  8/1974 Del Mar ....................... 482/72
3,884,317 A *  5/1975 Kinzel ......................... 180/220

(Continued)

OTHER PUBLICATIONS

Pedal Power, "Pedal Works", article is undated—printed on Jan. 26, 2004, references the year 2002, 2 pages, www.pedalpower.org/works.html, Vancouver, B.C.

(Continued)

*Primary Examiner*—Julio C. Gonzalez
(74) *Attorney, Agent, or Firm*—Khorsandi Patent Law Group; Marilyn R. Khorsandi

(57) ABSTRACT

The exemplary embodiment of the present invention provides a device for converting human power to electrical power. The exemplary device comprises: a plurality of gear wheels (e.g., 1, 2, 3, 4, 5 and 6) interconnected with a plurality of interconnection means (e.g., 12, 13, and 14); a first axle (9), said first axle (9) disposed through an opening in a center of a first gear wheel (1) of the plurality of gear wheels; a first pedal (18) mounted on a first pedal arm (17) and a second pedal (18) mounted on a second pedal arm (17), each pedal arm (17) mounted on opposing ends of the first axle (9); a second gear wheel (2) of the plurality of gear wheels interconnected to the first gear wheel (1) with a first interconnection means (12) of the plurality of interconnection means; an alternator (8) interconnected to one of the gear wheels (e.g., 6) of the plurality of gear wheels; a battery (22); and an inverter (27).

5 Claims, 28 Drawing Sheets

U.S. PATENT DOCUMENTS

| | | | | |
|---|---|---|---|---|
| 4,084,810 | A * | 4/1978 | Forsman | 482/5 |
| 4,298,893 | A * | 11/1981 | Holmes | 348/730 |
| 4,612,447 | A | 9/1986 | Rowe | |
| 4,612,494 | A * | 9/1986 | Kawamura | 322/4 |
| 4,613,129 | A | 9/1986 | Schroeder et al. | |
| 4,709,917 | A * | 12/1987 | Yang | 482/63 |
| 4,768,777 | A * | 9/1988 | Yang | 482/57 |
| 5,114,391 | A * | 5/1992 | Pitzen et al. | 482/62 |
| 5,252,859 | A | 10/1993 | Tagney, Jr. | |
| 5,256,115 | A * | 10/1993 | Scholder et al. | 482/6 |
| 5,616,104 | A * | 4/1997 | Mulenburg et al. | 482/57 |
| 6,229,224 | B1 * | 5/2001 | Gagne | 290/1 R |
| 6,433,450 | B1 | 8/2002 | Chao | |
| 6,507,128 | B2 * | 1/2003 | King et al. | 290/40 C |
| 6,731,017 | B2 * | 5/2004 | Mikhall et al. | 290/1 C |
| 6,930,403 | B2 * | 8/2005 | Hartman et al. | 290/1 A |
| 6,946,748 | B2 * | 9/2005 | Love | 290/1 C |
| 6,987,327 | B1 * | 1/2006 | Lucatero | 290/1 A |
| 7,009,350 | B1 | 3/2006 | Gold | |
| 7,049,708 | B2 * | 5/2006 | Hartman et al. | 290/1 A |
| 2004/0026925 | A1 * | 2/2004 | Tung Kong et al. | 290/1 R |
| 2005/0200221 | A1 * | 9/2005 | Vasilovich et al. | 310/156.37 |

OTHER PUBLICATIONS

"Pedal Power", article is undated—printed on Jan. 26, 2004, references the year 2000, 2 pages, www.humboldt.edu/~ccat/at/pedalpower/home.html.

Erickson, Ben, "Pedal Power: Spinning for the Future—Project by Bart Orlando and HSU Students", article is undated—printed on Jan. 26, 2004, 1 page, www.humboldt.edu/~ccat/at/pedalpower/future.html.

Garcia, Yvette, with technical advise from Bart Orlando, "Powering a Lap Top Computer at CCAT", article is undated—printed on Jan. 26, 2004, pp. 1-7, www.humboldt.edu/~ccat/at/pedalpower/Laptop.html.

Erickson, Ben, "Human Powered Energy Generator (HPEG)", article is undated—printed on Jan. 26, 2004, 3 pages, www.humboldt.edu/~ccat/at/pedalpower/hgen.html.

Erickson, Ben, "The Human Energy Converter (HEC) at CCAT—project by Bart Orlando and HSU Students", article is undated—printed on Jan. 26, 2004, 2 pages, www.humboldt.edu/~ccat/at/pedalpower/HEC.html.

Erickson, Ben, CCAT's Pedal Power Blender—Project by Bart Orlando and HSU Students, article is undated—printed on Jan. 26, 2004, 2 pages, www.humboldt.edu/~ccat/at/pedalpower/blend.html.

Erickson, Ben, CCAT's Pedal Power Television/VCR—Project by Bart Orlando and HSU Students, article is undated—printed on Jan. 26, 2004, 1 page, www.humboldt.edu/~ccat/at/pedalpower/Television.html.

Preuit, Amy, "Setting Up a Pedal Powered Washing Machine", article is undated—printed Jan. 26, 2004, 2 pages, www.humboldt.edu/~ccat/at/pedalpower/WashingMachine.html.

Erickson, Ben, Pedal Power Washing Machine—Project by Bart Orlando and HSU Students, article is undated—printed on Jan. 26, 2004, 1 page, www.humboldt.edu/~ccat/at/pedalpower/washme.html.

Orlando, Bart, "CCAT's Pedal Powered Saws—Project by Bart Orlando, and HSU Students", (photographs) article is undated—printed on Jan. 26, 2004, 1 page, www.humboldt.edu/~ccat/at/pedalpower/TableSaw.html.

Erickson, Ben, "CCAT's Pedal Drill Press—Project by Bart Orlando, and HSU Students", (with photographs) article is undated—printed on Jan. 26, 2004, 2 pages, www.humboldt.edu/~ccat/at/pedalpower/Drill.html.

Erickson, Ben, "CCAT's Pedal Power Grinder—Project by Bart Orlando, and HSU Students", article is undated—printed on Jan. 26, 2004, www.humboldt.edu/~ccat/at/pedalpower/grind.html.

Svehla, Jeremy, with technical advise by Bart Orlando, "How to Build Human Powered Belt Sander", article is undated—printed on Jan. 26, 2004, 5 pages, www.humboldt.edu/~ccat/at/pedalpower/sandme.html.

Svehla, Jeremy, "How to Build Human Powered Belt Sander", article is undated, 5 pages.

Association for India's Development, "Decentralized Electricity", article is undated—printed on Jan. 26, 2004, Mentions years 2000 to 2003, © 2000, 2 pages, College Park, MD, www.aidindia.org/hq/projects/illus/pedal.htm.

Association for India's Development, "Pedal Power Generator", article is undated—printed on Jan. 26, 2004, referencing the years 2000-2002, © 2000, 3 pages, College Park, MD. www.aidindia.org/hq/projects/illus/pedal2.htm.

Butcher, David "Pedal Powered Generator", article is undated—printed Jan. 26, 2004, 5 pages, www.los-gatos.ca.us/davidbu/pedgen.html.

Wi-Fi Planet, "Pedal Power: Look Ma No Wires", Aug. 30, 2002, 3 pages, http://integral.typepad.com/everydayguru/2003/12/pedal_power_loo.html and www.wi-fiplanet.com/columns/prints.php/1454991.

Mion, Ian, "S4-15 Pedal Power", EcoVersity—Sustainable Living/Land-based Learning, undated 2004 course description, www.ecoversity.org/CurrentWebpages/2004SpringCECourses/S4-15PedalPower.htm.

"Pedal Power Pack and Rural Energy Security", Center for Renewable Energy, article is undated—Mentions conversion rate for US$ on Aug. 17, 2002, printed on Jan. 26, 2004, www.namstct.org/pppre.htm.

McCullagh, James C., "Pedal Power—In Work, Leisure, and Transportation", Table of Contents, Rodale Press, © 1977, http://ww2.green-trust.org:8383/2000/pedalpower/default.htm.

Erickson, Ben "Pedal Power: Spinning for the Future at CCAT", printed on Jan. 26, 2004, http://ww2.green-trust.org:8383/2000/humanpower.htm.

McCullagh, James C., "Pedal Power", Acknowledgments, printed on Jan. 26, 2004, 1 page, http://ww2.green-trust.org:8383/2000/pedalpower/ppack.htm.

"Pedal Power", Introduction, 3 pages, printed on Jan. 26, 2004, http://ww2.green-trust.org:8383/2000/pedalpower/ppintro.htm.

Wilson, David Gordon, "Pedal Power", Chapter 1 (Human Muscle Power in History), 7 pages, printed on Jan. 26, 2004, http://ww2.green-trust.org:8383/2000/pedalpower/ppch1.htm.

Le Bon, Bill "Pedal Power Produce Update", Culture Change/Sustainable Energy Institute, 3 pages, undated Arcata, CA., www.culturechange.org/issue14/pedalpowerupdate.html.

Piggott, Hugh, PMG Construction Manual, Feb. 2001, The Schumacher Centre for Technology and Development, Warwickshire, England. 49 pages.

Coleman® Sentinel Flashlight™, "Instruction Manual", The Coleman Company, Inc., © 2001, Wichita, KS. 2 pages.

* cited by examiner

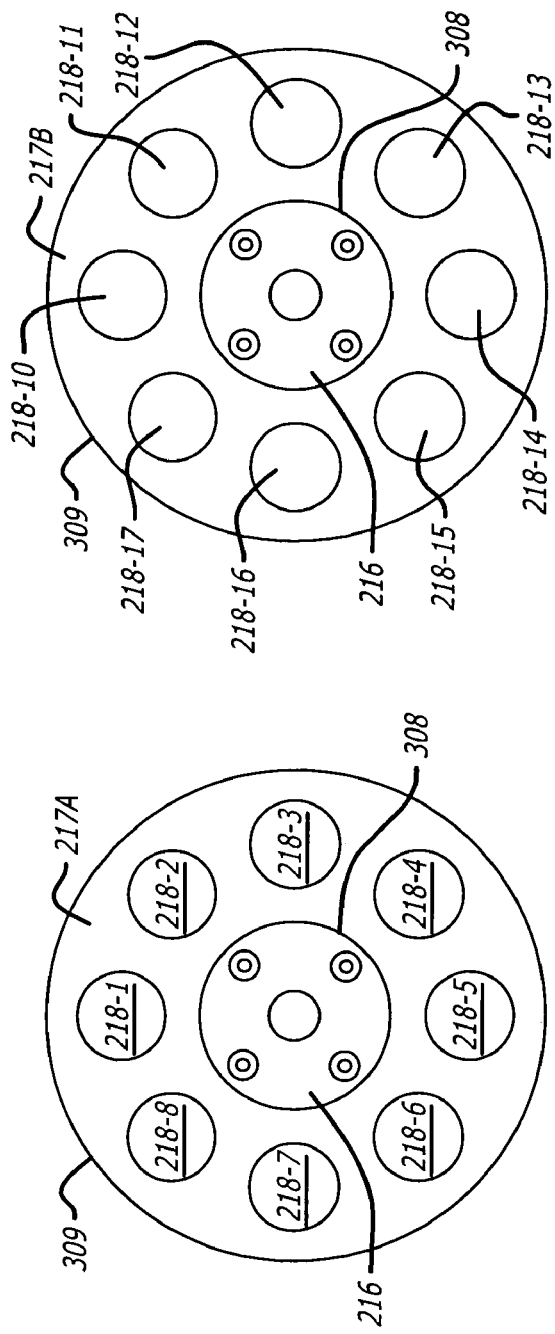
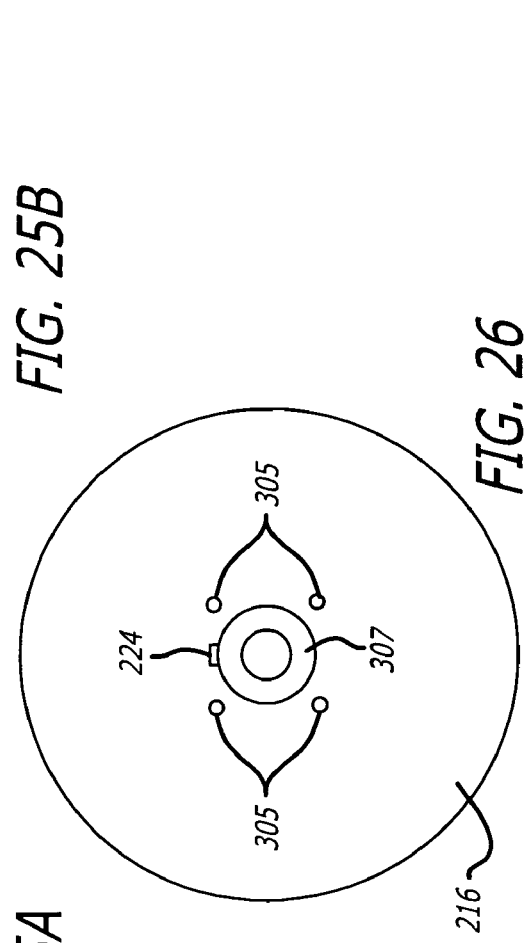
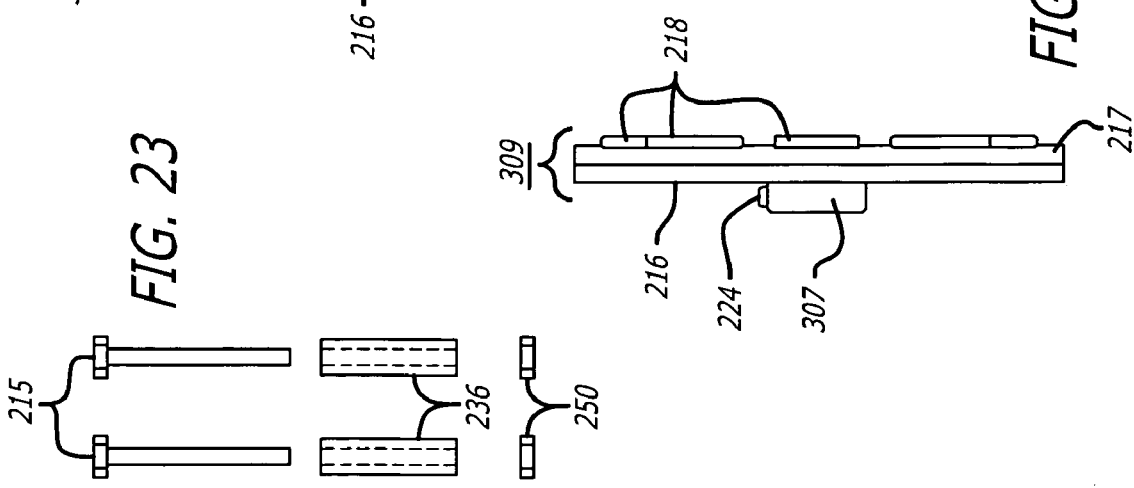

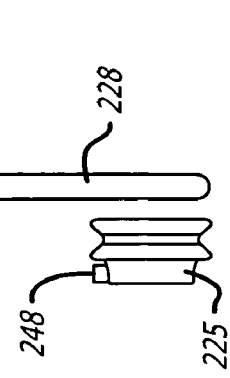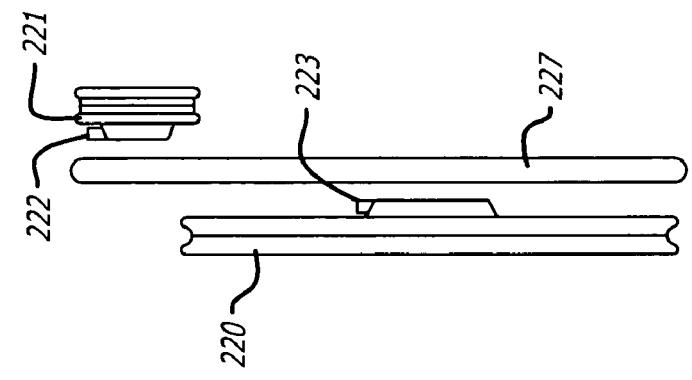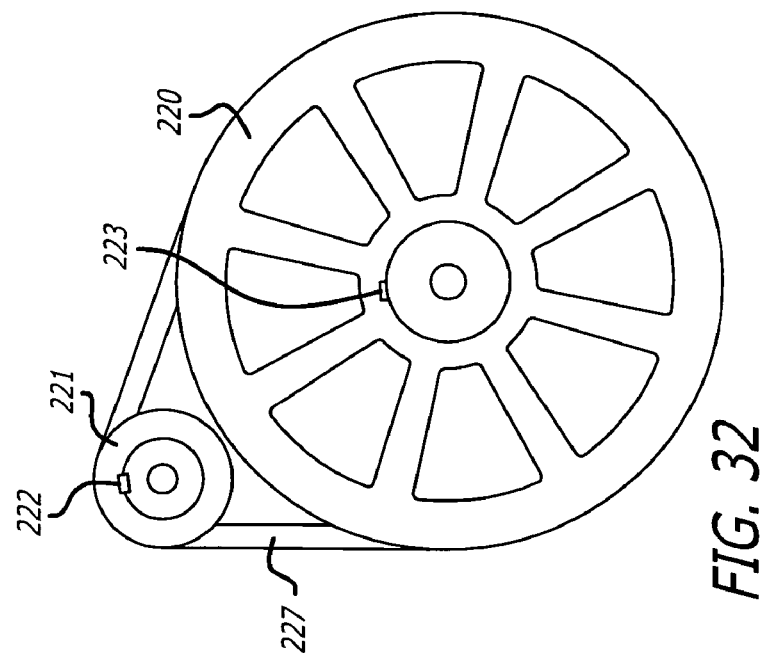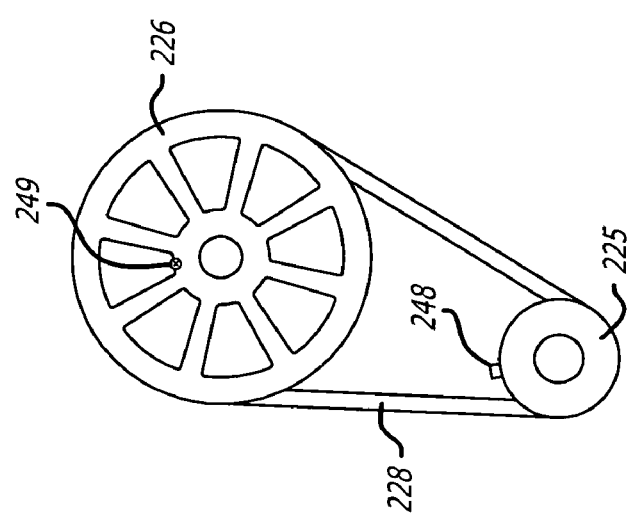
FIG. 34
FIG. 33
FIG. 32
FIG. 31

METHOD AND APPARATUS FOR CONVERTING HUMAN POWER TO ELECTRICAL POWER

CROSS REFERENCE TO RELATED APPLICATIONS

This application claims priority to U.S. Provisional Patent Application Ser. No. 60/545,383, entitled "METHOD AND APPARATUS FOR CONVERTING HUMAN POWER TO ELECTRICAL POWER", filed Feb. 18, 2004, the entire disclosure of which is incorporated herein in full by reference as if stated in full herein.

FIELD OF THE INVENTION

The field of the present invention is mechanical power converters, and more particularly, machines for converting human-source mechanical power to electrical power.

SUMMARY OF THE INVENTION

The exemplary embodiment of the present invention resembles a stationary bicycle (see, e.g., FIGS. 2C and 2D) without a seat. The exemplary embodiment can be placed in front of a chair in which a person is sitting; the person can place their feet on the exemplary pedals of the exemplary embodiment, and pedal. The exemplary pedals are mounted on respective exemplary pedal arms, which are in turn mounted on opposing ends of a first axle.

The first axle of the exemplary embodiment extends through a center hole in a first geared sprocket wheel. The first geared sprocket wheel has a twelve-inch diameter. One complete revolution of the pedals translates into one complete revolution of the first geared sprocket wheel. In the exemplary embodiment, the pedals and pedal arms are mounted in such a way, and the pedal arms are of such a length, to provide ease of use and lower the torque needed to revolve the first geared sprocket wheel.

When the person pedals, the mechanical motion of the person's pedaling is exerted on the first axle that extends through the first geared sprocket wheel. A sprocket chain connects the first geared sprocket wheel to a second geared sprocket wheel. The second geared sprocket wheel has a diameter that is smaller than the diameter of the first geared sprocket wheel. In the case of the exemplary embodiment, the second geared sprocket wheel has a diameter of seven inches. Because the second geared sprocket wheel's diameter is smaller than the first geared sprocket wheel's diameter, for every revolution of the first geared sprocket wheel, the second geared sprocket wheel makes more than one revolution. In the case of the exemplary embodiment, for every revolution of the first geared sprocket wheel, the second geared sprocket wheel revolves 1.71 times.

The second geared sprocket wheel is mounted on a second axle. The second axle extends through a third gear wheel. The third gear wheel has a diameter of 11.5 inches. The third gear wheel is adapted to receive a first v-belt. The first v-belt connects the third gear wheel to a fourth gear wheel. The fourth gear wheel has a diameter of five inches and is adapted to receive a v-belt such as the first v-belt. The fourth gear wheel is mounted on a third axle. The third axle extends through a fifth wheel, which in the exemplary embodiment is a flywheel, with a diameter of 15.5 inches, and through a sixth gear wheel. The sixth gear wheel has a diameter of 11.5 inches and is adapted to receive a v-belt such as a second v-belt.

In the exemplary embodiment, an alternator is provided on which is mounted an alternator pulley wheel. In order to generate electricity, the alternator pulley wheel must rotate about 1100 times per minute (1100 revolutions per minute —1100 RPMs). The exemplary embodiment multiplies each revolution of the pedals and the first gear wheel according to the diameter ratios of the various gear wheels and the alternator pulley wheel. As described in further detail below, the exemplary embodiment multiplies each revolution of the pedals and the first gear wheel by 12.91 times at the alternator pulley wheel. Thus, when a person rotates the pedals at approximately 86 revolutions per minute, the alternator pulley wheel revolves approximately 1100 times per minute. The exemplary embodiment produces electrical energy through the alternator, stores the energy in a battery, and provides electrical energy for use by a 110/120 AC current appliance through an inverter.

In alternative embodiments, it would be possible to eliminate the exemplary flywheel; only five gear wheels plus the alternator pulley wheel could be provided. It would also be possible to further reduce the number of gear wheels. However, in order to produce 1100 RPMs, an embodiment with less than five or six gear wheels would feature larger gear wheels and/or would require more power to overcome higher torque.

The exemplary embodiment of the present invention provides a device for converting human power to electrical power. With reference to FIG. 17, the exemplary device comprises: a plurality of gear wheels (e.g., 1, 2, 3, 4, 5 and 6) interconnected with a plurality of interconnection means (e.g., 12, 13, and 14); a first axle (9), said first axle (9) disposed through an opening in a center of a first gear wheel (1) of the plurality of gear wheels; a first pedal (18) mounted on a first pedal arm (17) and a second pedal (18) mounted on a second pedal arm (17), each pedal arm (17) mounted on opposing ends of the first axle (9); a second gear wheel (2) of the plurality of gear wheels interconnected to the first gear wheel (1) with a first interconnection means (12) of the plurality of interconnection means; an alternator (8) interconnected to one of the gear wheels (e.g., 6) of the plurality of gear wheels; a battery (22); and an inverter (27).

In the exemplary embodiment, the alternator is interconnected to one of the gear wheels of the plurality of gear wheels with one of the plurality of interconnection means. However, in a yet further alternative exemplary embodiment (sometimes referred to herein as the "PMG embodiment" or as the "exemplary PMG embodiment"), the alternator is integral to one of the gear wheels of the plurality of gear wheels. In the PMG embodiment, the gear wheel to which the alternator is integral comprises a permanent magnet generator assembly.

The exemplary embodiment of the present invention further provides a device for converting human power to electrical power that comprises: an alternator; an alternator pulley wheel mounted on the alternator; a battery for storing direct current electrical energy; an inverter for converting direct current electrical energy into alternating current electrical energy; a manually-operated first gear wheel comprising a center opening; a second gear wheel, a third gear wheel, a fourth gear wheel, a fifth gear wheel, and a sixth gear wheel; a first axle disposed through the manually-operated first gear wheel center opening; a second axle disposed through a center opening in the second gear wheel and through a center opening in the third gear wheel such that the second gear wheel and the third gear wheel are mounted on the second axle; third axle disposed through a center opening in the fourth gear wheel, and through a center opening in the fifth gear wheel, and through a center opening in the sixth gear wheel such that the fifth gear wheel is mounted on the third axle between the sixth gear wheel and the fourth gear wheel; a first manual-operation means mounted to a first end of the first axle and a second manual-operation means mounted to a second end of the first axle; a first interconnecting means interconnectably mounted to the manually-operated first gear wheel, said first interconnecting means interconnecting the manually-operated first gear wheel to the second gear wheel; a second interconnecting means interconnectably mounted to the third gear wheel, said second interconnecting means interconnecting the third gear wheel to the fourth gear wheel; and a third interconnecting means interconnectably mounted to the sixth gear wheel, interconnecting the sixth gear wheel to the alternator pulley wheel.

The exemplary embodiment further provides an adapter for connecting rotary-motion exercise equipment to mechanically operate a device for converting mechanical power to electrical power, said adapter comprising: a shaft; a shaft sleeve wherein said shaft sleeve is adapted for connection to an axle for mechanically operating the mechanical conversion device; and an adjustable chuck adapted for fastening on to a rotary axle of a rotary-motion exercise device.

The exemplary embodiment further provides a method for converting mechanical power to electrical power, said method comprising: mounting a flywheel with a centrifugally-weighted outer rim to an alternator; mounting an alternator pulley wheel to the alternator; and connecting one of a plurality of interconnected gear wheels to the alternator pulley wheel.

The exemplary embodiment further provides a pedal for operating a rotary motion device, said pedal comprising: an oblong rim adapted for receiving a sole of a human foot or shoe, said oblong rim having a perimeter, a front end, a back end, a first side and a second side; and a centered cross-piece that extends from a center point on the first side of the oblong rim to a center point on the second side of the oblong rim, said cross-piece forming a first space between the cross-piece and the front end adapted for receiving four fingers of a human hand, said cross-piece forming a second space between the cross-piece and the back end adapted for receiving a thumb of a human hand.

BRIEF DESCRIPTION OF THE DRAWINGS

These and other features, aspects, and advantages of the present invention will become better understood with regard to the following description, appended claims, and accompanying drawings in which:

FIG. 23 is a plan view of bolts, spacers and nuts that are used to hold exemplary rotor/steel plate assemblies together in the further alternative exemplary device in the exemplary PMG embodiment of the present invention;

FIG. 24 is a detailed front plan view of an exemplary rotor/steel plate assembly in the further alternative exemplary device in the exemplary PMG embodiment of the present invention;

FIG. 25A is a side plan view of an exemplary rotor/steel plate assembly in the further alternative exemplary device in the exemplary PMG embodiment of the present invention;

FIG. 25B is a side plan view of a counter-posed exemplary rotor/steel plate assembly in the further alternative exemplary device in the exemplary PMG embodiment of the present invention;

FIG. 26 is a side plan view of a steel plate in the further alternative exemplary device in the exemplary PMG embodiment of the present invention;

FIG. 31 is a plan view of an exemplary first V-belt pulley and an exemplary second V-belt pulley connected via an exemplary first V-belt in the further alternative exemplary device in the exemplary PMG embodiment of the present invention;

FIG. 32 is a plan view of an exemplary third V-belt pulley and an exemplary fourth V-belt pulley connected via an exemplary second V-belt in the further alternative exemplary device in the exemplary PMG embodiment of the present invention;

FIG. 33 is a front plan exploded view of an exemplary third V-belt pulley and an exemplary fourth V-belt pulley connected via an exemplary second V-belt in the further alternative exemplary device in the exemplary PMG embodiment of the present invention;

FIG. 34 is a front plan exploded view of an exemplary first V-belt pulley and an exemplary second V-belt pulley connected via an exemplary first V-belt in the further alternative exemplary device in the exemplary PMG embodiment of the present invention;

DETAILED DESCRIPTION OF THE INVENTION

Figure 1:
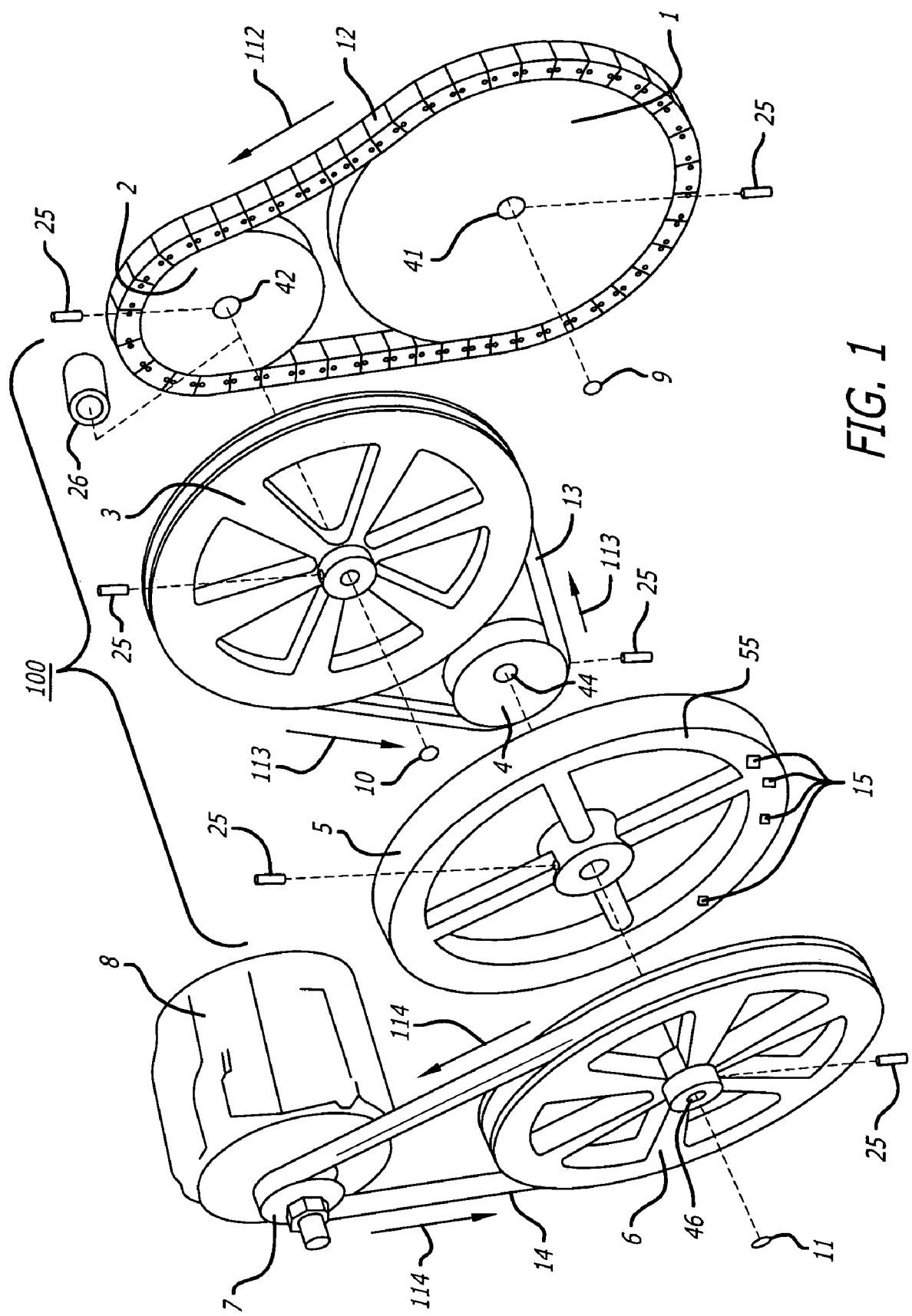
FIG. 1 is an exploded perspective view of exemplary gear box transmission components of an exemplary device for converting human power, or mechanical power, to electrical power in an exemplary embodiment of the present invention.

FIG. 1 is an exploded perspective view of exemplary gear box transmission 100 components of an exemplary device for converting human power, or mechanical power, to electrical power, in an exemplary embodiment of the present invention.

As depicted in FIG. 1, an alternator 8 is provided. In the exemplary embodiment, alternator 8 is a Chevrolet 350 V-8, 12-volt alternator.

It will be understood by someone with ordinary skill in the art that use in the exemplary embodiment of a 12-volt alternator is illustrative and not a limitation of the invention. For example, in one alternative embodiment, a 16-volt alternator could be used.

As depicted in FIG. 1, alternator 8 further comprises an alternator pulley wheel 7 mounted to alternator 8. In the exemplary embodiment, alternator pulley wheel 7 is a factory-set alternator v-belt pulley wheel with a 3.5 inch outer diameter.

The term "outer diameter" as used herein means the diameter measured from a point on the exterior perimeter of the subject component, such as a pulley, or a wheel, to a point on the opposite side of the exterior perimeter of the subject component.

It will be understood by someone with ordinary skill in the art that use in the exemplary embodiment of pulleys and wheels with particular inner and outer diameters described herein are illustrative and are not a limitation of the invention. In alternative embodiments, different inner- and outer-dimensioned pulleys and wheels could be used. However, as will be understood by someone with ordinary skill in the art, use of different inner- and outer-dimensioned pulleys and wheels could vary the gear ratios described in more detail below and could therefore impact the human-to-electrical power conversion ratios described in more detail below.

It will be understood by someone with ordinary skill in the art that the term wheel is sometimes used herein to refer to gear wheels. Gear wheels in the exemplary embodiment are identified in the figures as wheel 1, wheel 2, wheel 3, wheel 4, wheel 5, wheel 6, and an alternator pulley wheel 7. References to wheel 1, first geared sprocket wheel 1, manually-operated first gear wheel 1, and the like, will be understood to mean reference to gear wheel 1; references to wheel 2 will be understood to mean reference to gear wheel 2; references to wheel 3 will be understood to mean reference to gear wheel 3; references to wheel 4 will be understood to mean reference to gear wheel 4; references to wheel 5 and/or to flywheel 5 will be understood to mean reference to gear wheel 5; references to wheel 6 will be understood to mean reference to gear wheel 6; Wheels 20, such as depicted in, e.g., FIG. 2A, are transport wheels.

It will be further understood by someone with ordinary skill in the art that description of a particular type of gear wheel for a particular component of the exemplary embodiment is illustrative and non-limiting. For example, in the exemplary embodiment, as described further below, wheels 1 and 2 are geared sprocket wheels; wheels 3, 4 and 6 are pulley gear wheels; wheel 5 is a flywheel. Other types of gear wheels could be used in alternative embodiments. For example, in an alternative embodiment, wheels 1 and 2 could be pulley gear wheels; wheels 3, 4 and 6 could be geared sprocket wheels; flywheel 5 could be adapted to receive a pulley v-belt.

Figure 2A:
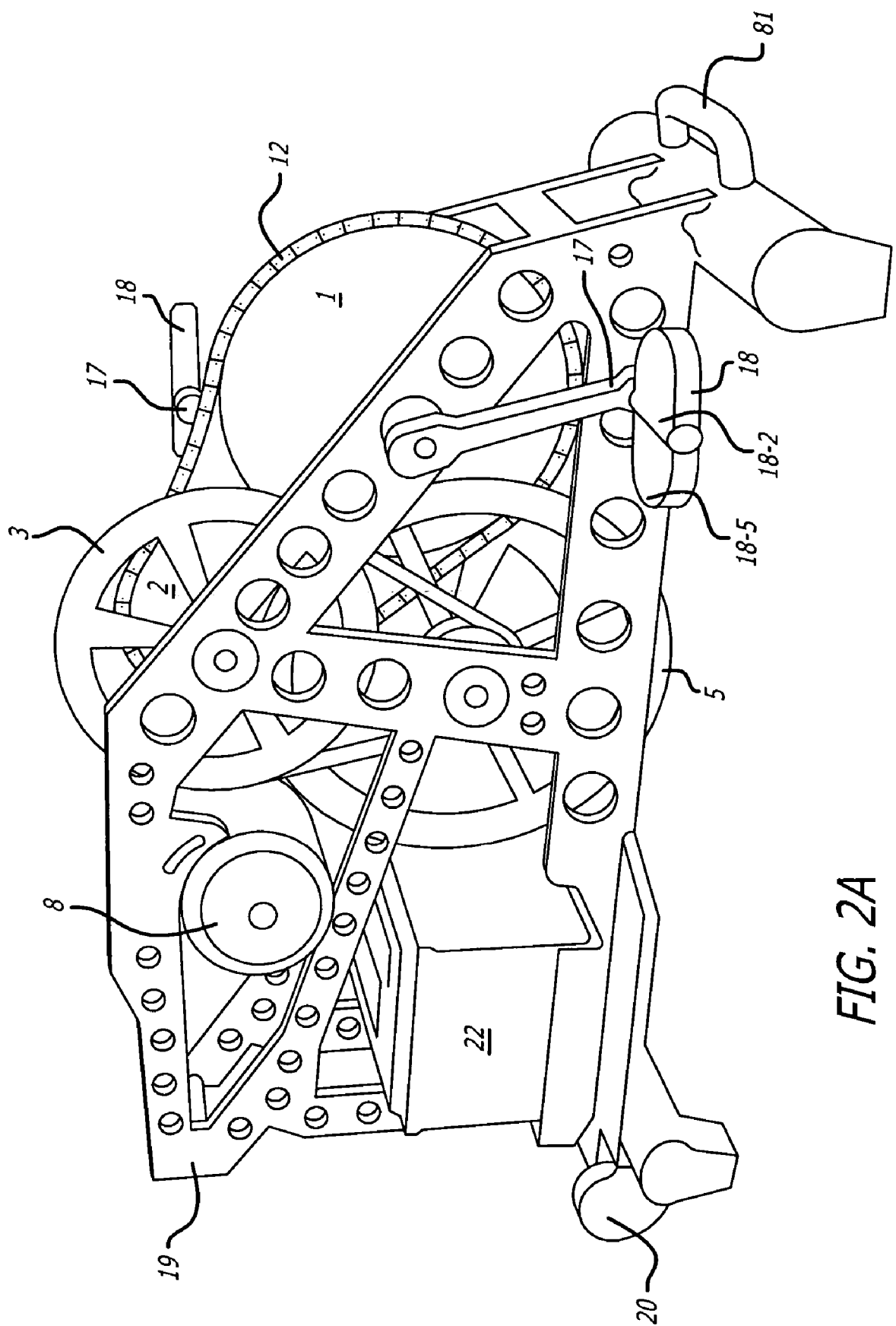
FIG. 2A is a perspective view of a left side of an assembled exemplary gear box transmission of the exemplary device for converting human power to electrical power in the exemplary embodiment of the present invention.
Figure 11:
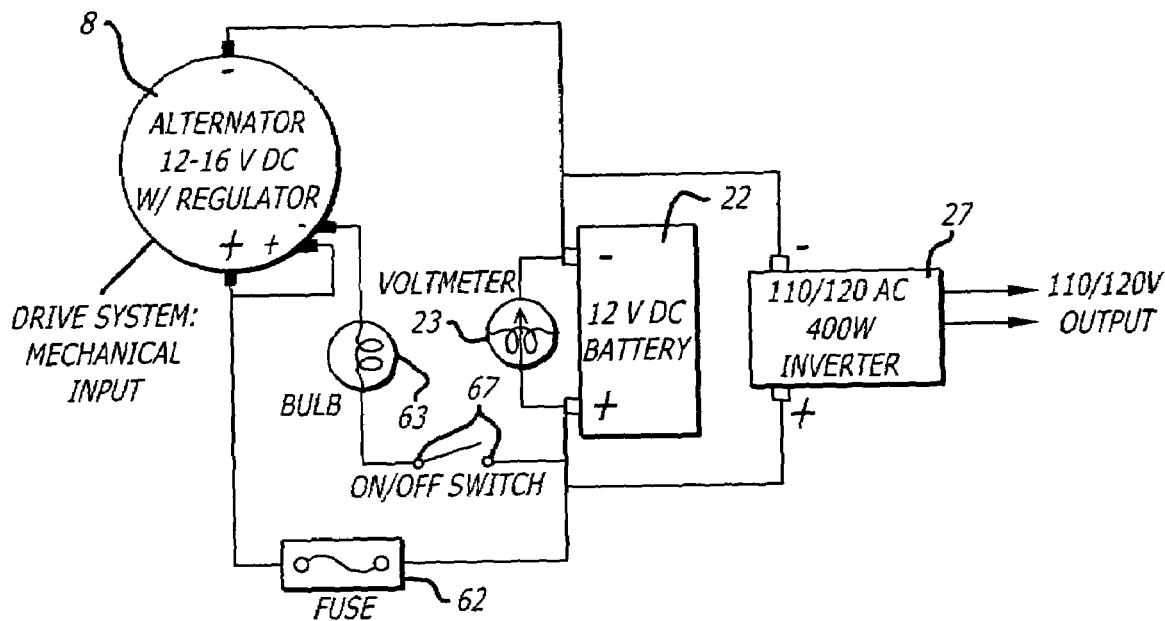
FIG. 11 is a schematic diagram of exemplary electrical components of the exemplary embodiment of the present invention.
Figure 12:
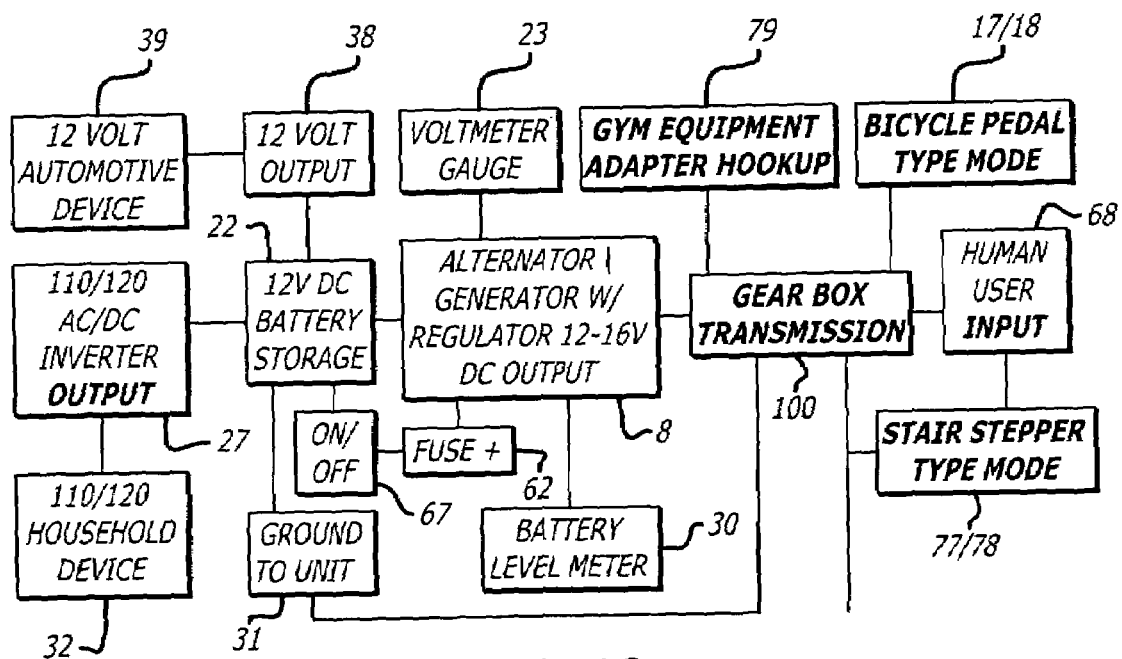
FIG. 12 is block diagram of exemplary electrical components of the exemplary embodiment of the present invention.

As will be discussed in more detail below, as depicted in FIGS. 11, 12, and 2A, alternator 8 is connected to a battery 22 for storing direct current electrical energy; battery 22 is connected to an inverter 27 for converting direct current electrical energy into alternating current electrical energy.

Returning with reference to FIG. 1, the exemplary embodiment of the present invention further provides a first wheel 1. In the exemplary embodiment, first wheel 1 is a geared sprocket (40B72) wheel with a twelve inch outer diameter.

In the exemplary embodiment, geared sprocket wheel 1 comprises an opening 41 disposed at the center of geared sprocket wheel 1, such as through which an axle can be inserted. In the exemplary embodiment, opening 41 has a three-quarter inch diameter; geared sprocket wheel 1 has an inner diameter of 0.75 inches.

The term "inner diameter" as used herein refers to the diameter of an opening in the center of a wheel, such as through which an axle can be inserted.

In the exemplary embodiment, a main drive axle 9 is inserted through opening 41. A first mechanical-operation means (see e.g., elements 17 and 18 in FIG. 2A) is mounted to one end of main drive axle 9. A second mechanical-operation means (see e.g., elements 17 and 18 in FIG. 2B) is mounted to the opposing end of main drive axle 9. In the exemplary embodiment depicted in FIG. 1, the first and second mechanical-operation means each comprise a foot pedal 18 mounted on a pedal arm 17, which is in turn mounted on main drive axle 9 using three 0.75 inch inner diameter inset bearings 16A, 16B, and 16C (See, e.g., FIGS. 15, 16, and 17).

Figure 14:
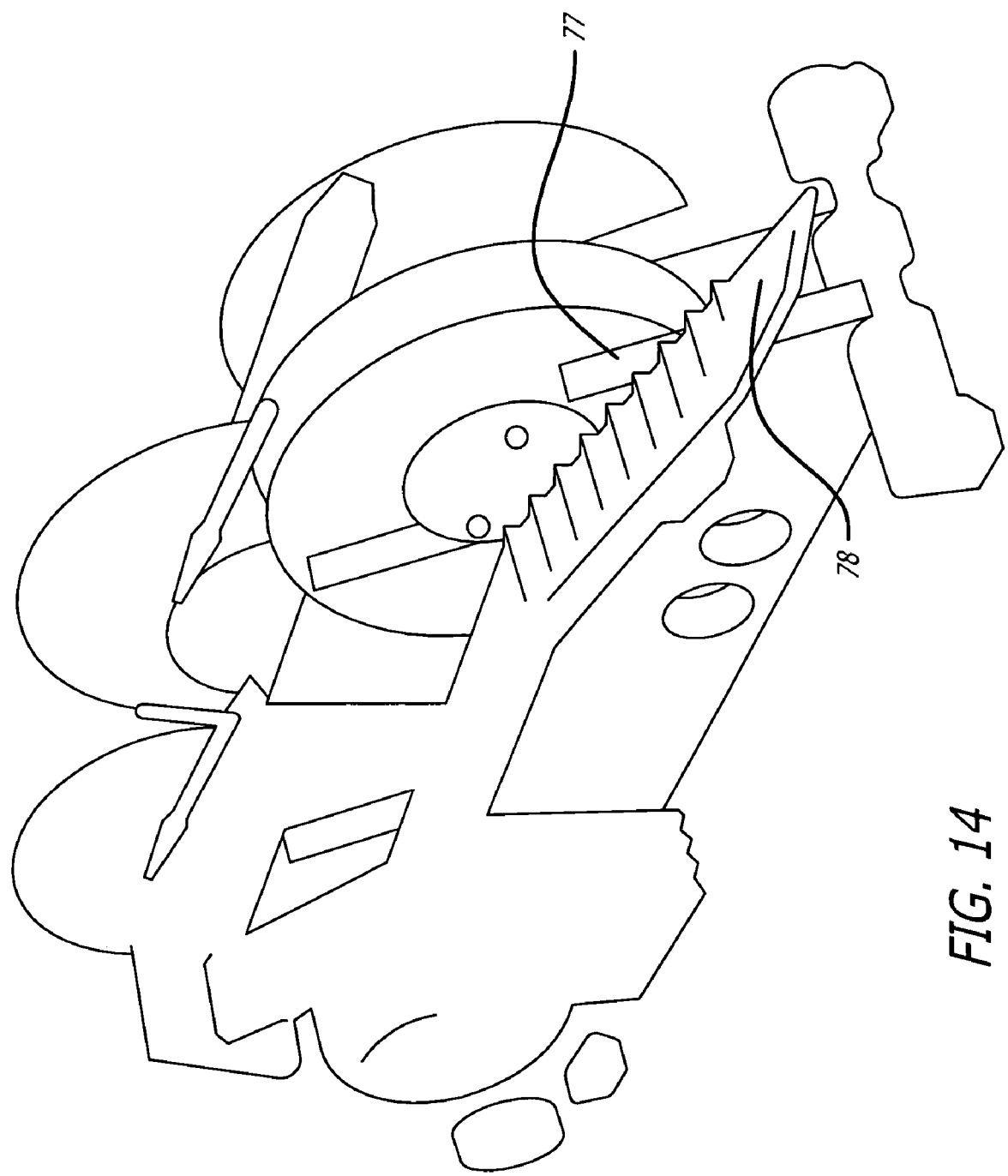
FIG. 14 is a perspective view of an alternative embodiment of the present invention in which exemplary elliptical-motion stair-stepper pedals have been attached to the exemplary main axle.

It will be understood by someone with ordinary skill in the art that use in the exemplary embodiment of manually-operated foot-pedals as mechanical-operation means is illustrative and not a limitation of the invention. For example, in the exemplary embodiment, as is further described below, manual-operation means 17 and 18 can also be hand-operated. In alternative embodiments, pedals could be provided that would be hand-operated but not foot-operated. In a further alternative embodiment, elliptical-exerciser pedals 78/77 could be used (see, e.g., FIG. 14). In a yet further alternative embodiment, stair-stepper pedals could be used. For alternative embodiments using manual-operation means that do not operate in a circular motion, an adapter between such manual-operation means and axle 9 would be provided.

Figure 15:
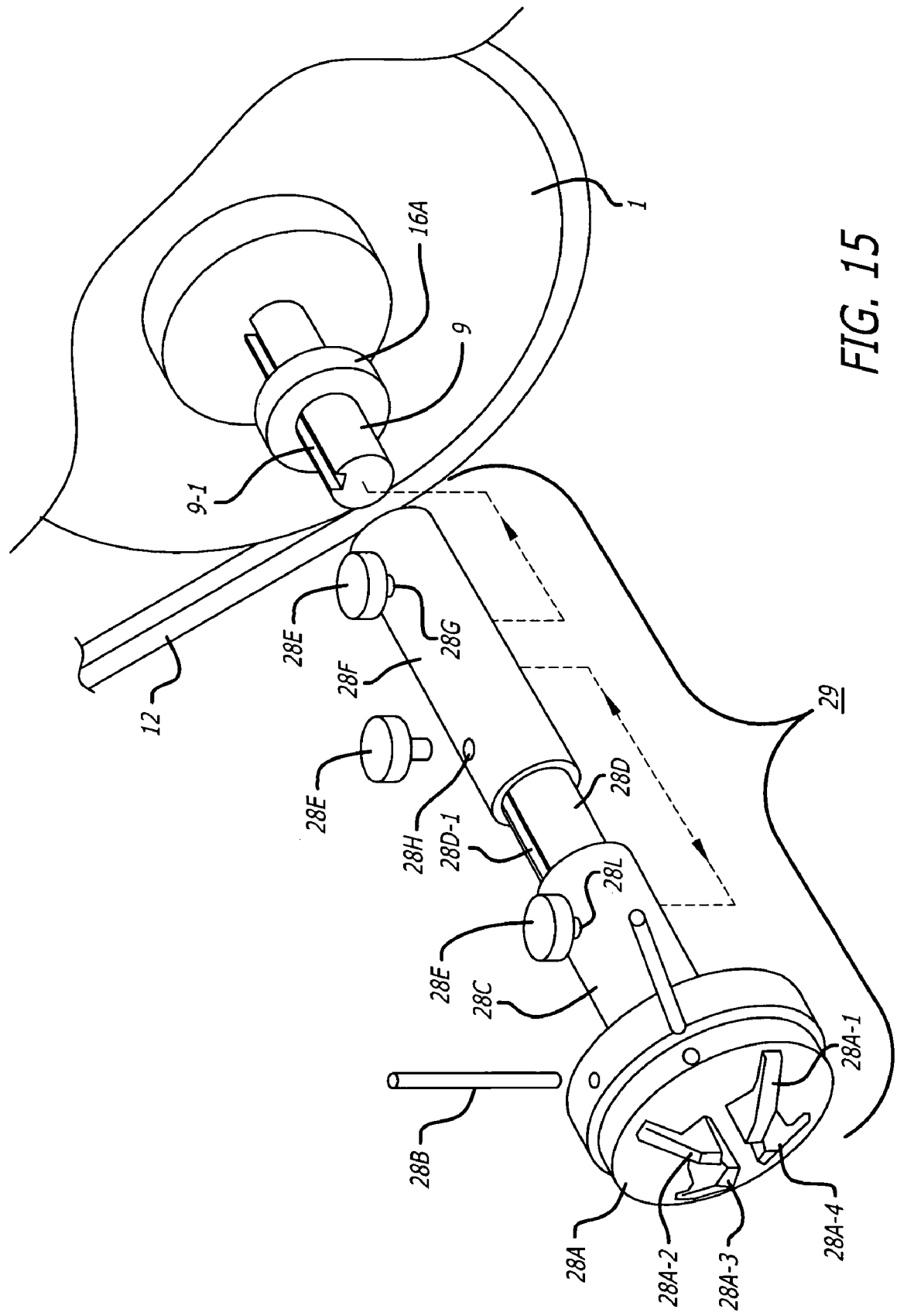
FIG. 15 is a perspective view of an exemplary rotary exercise equipment adapter for the exemplary embodiment of the present invention.
Figure 16:
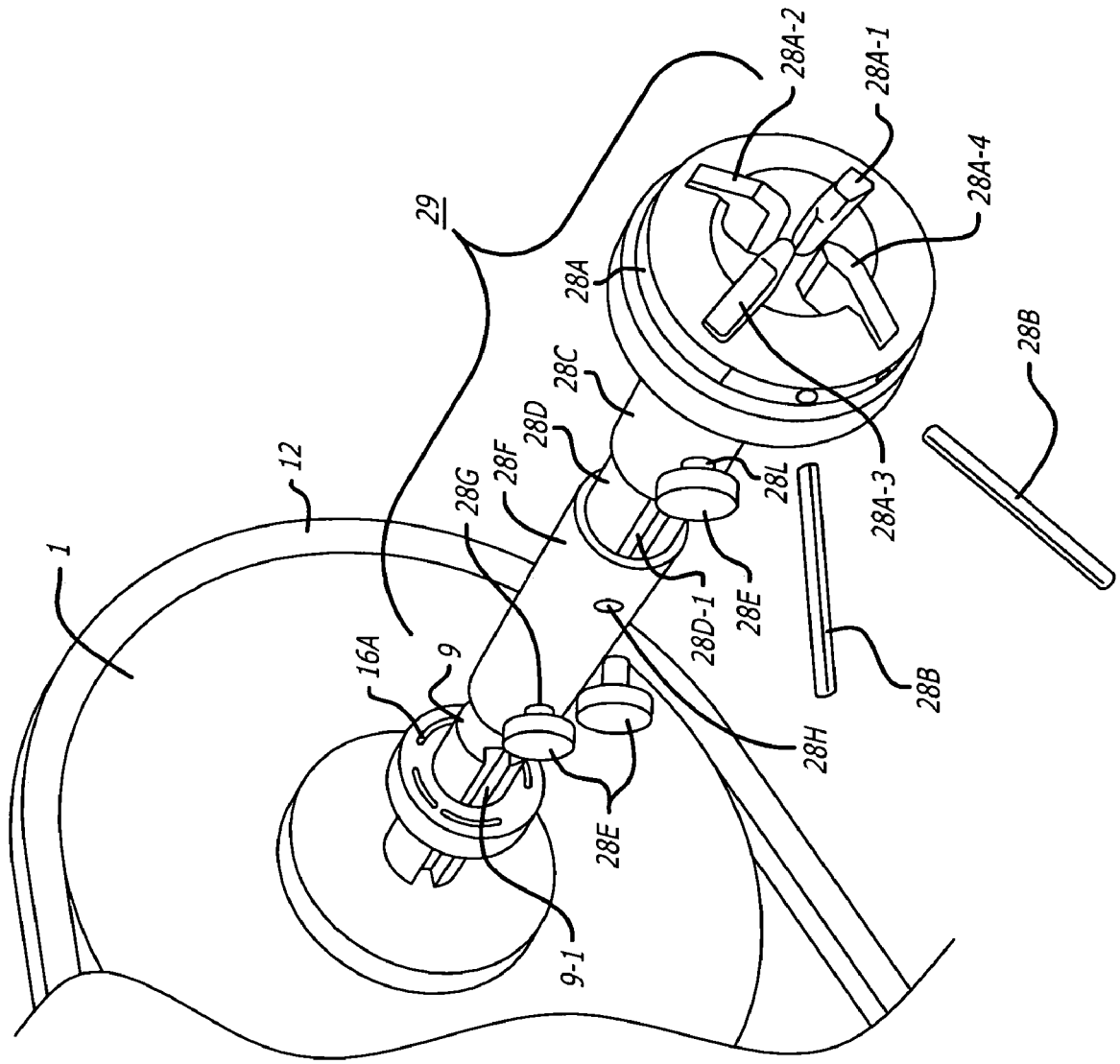
FIG. 16 is an enlarged perspective view of an exemplary rotary exercise equipment adapter for the exemplary embodiment of the present invention.

In the exemplary embodiment, with reference to FIGS. 12, 15 and 16, an adapter 79 is provided for connecting the exemplary embodiment to rotary motion exercise equipment, e.g., an exercise bicycle. Adapter 79 would be used as an alternative to manual-operation means 17 and 18.

As depicted in FIGS. 15 and 16, adapter 79 provides a grooved telescoping shaft 28D fitted in sleeve 28F. Shaft 28D provides a keyway groove 28D-1 that spans the length of shaft 28D. Screw 28E would be fastened through sleeve screw hole 28H in sleeve 28F and into groove 28D-1 to fasten sleeve 28F to shaft 28D. Axle 9 would also be provided with a keyway groove 9-1 adapted for receiving screws 28E. Screw 28E would be used to fasten sleeve 28F to axle 9 by fastening through sleeve screw hole 28G into axle groove 9-1. Telescoping sleeve 28C would be adjustably connected to shaft 28D by screwing a screw 28E through sleeve screw hole 28L in sleeve 28C into keyway groove 28D-1. Chuck (similar to a Sureline lathe chuck) 28A would be welded on, or machined as part of, telescoping sleeve 28C. Chuck keys 28B would be used to open chuck teeth 28A-1 through 28A-4 of chuck 28A to accept a center axle of a rotary exercise equipment device, such as for example, a center axle of an exercise bicycle wheel. Chuck keys 28B would then be used to tighten chuck teeth 28A-1 through 28A-4 over the subject exercise device center axle. Once chuck teeth 28A-1 through 28A-4 have been tightened, when the center axle of the subject exercise device is rotated, chuck 28A will be rotated, thereby rotating main axle 9, which will in turn rotate wheel 1 and the remainder of the gear box transmission 100.

In the exemplary embodiment, a second wheel 2, a third wheel 3, a fourth wheel 4, a fifth wheel 5, and a sixth wheel 6 are provided.

As depicted in FIG. 1, in the exemplary embodiment, second wheel 2 is a geared sprocket (40B45) wheel 2. In the exemplary embodiment, second geared sprocket wheel 2 has a seven inch outer diameter. In the exemplary embodiment, second geared sprocket wheel 2 comprises an opening 42 disposed at the center of second geared sprocket wheel 2; opening 42 has a three-quarter inch diameter. That is, second wheel 2 has an inner diameter of 0.75 inches.

As depicted in FIG. 1, third wheel 3 is a v-belt pulley wheel 3. In the exemplary embodiment, third wheel 3 has an outer diameter of 11.5 inches. In the exemplary embodiment, third wheel 3 provides an opening 43 disposed at the center of third wheel 3. In the exemplary embodiment, opening 43 has a diameter of 0.75 inches. That is, third wheel 3 has an inner diameter of 0.75 inches.

In the exemplary embodiment, a second axle 10 is disposed through opening 43 of third wheel 3 and through opening 42 of second wheel 2. In the exemplary embodiment, second axle 10 is a drive axle with an outer diameter of 0.75 inches. In the exemplary embodiment, second axle 10 is disposed through opening 42 of second wheel 2 and through center opening 43 of third wheel 3 such that second wheel 2 and the third wheel 3 are mounted on second axle 10.

As depicted in FIG. 1, in the exemplary embodiment, fourth wheel 4 is a v-belt pulley wheel. In the exemplary embodiment, fourth wheel 4 has an outer diameter of five inches. In the exemplary embodiment, an opening 44 is provided at the center of fourth wheel 4. In the exemplary embodiment, opening 44 has a diameter of 0.75 inches. That is, fourth wheel 4 has an inner diameter of 0.75 inches.

As depicted in FIG. 1, in the exemplary embodiment, fifth wheel 5 is a flywheel with a weighted rim 55. In the exemplary embodiment, fifth wheel has an outer diameter of 15.5 inches and weighs approximately fifteen pounds. In the exemplary embodiment, an opening 45 is provided at the center of fifth wheel 5. In the exemplary embodiment, opening 45 has a diameter of 0.75 inches. That is, fifth wheel 5 has an inner diameter of 0.75 inches.

Figure 6:
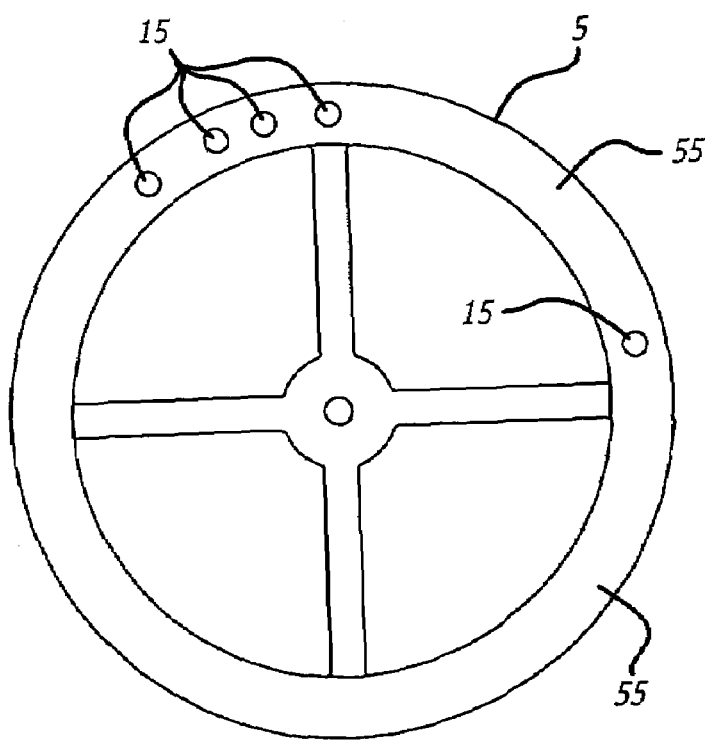
FIG. 6 is a plan view of an exemplary flywheel fifth wheel in the exemplary embodiment of the present invention.
Figure 7:
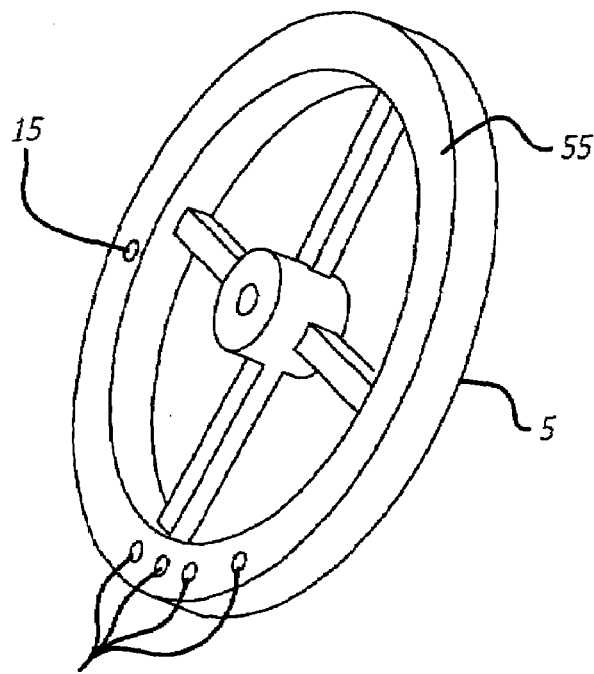
FIG. 7 is a perspective view of the exemplary flywheel fifth wheel in the exemplary embodiment of the present invention.
Figure 8:
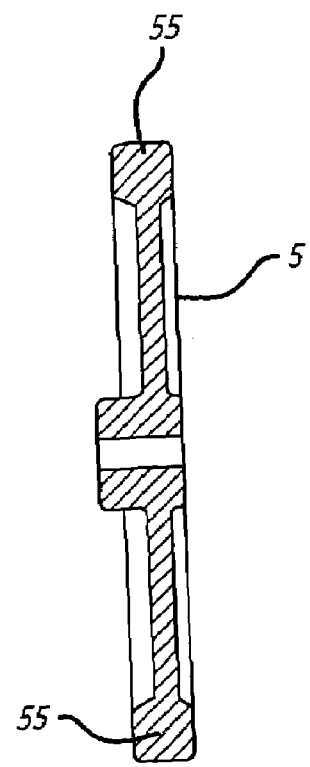
FIG. 8 is a cross-sectional view of the exemplary flywheel fifth wheel in the exemplary embodiment of the present invention.

FIGS. 6, 7, and 8 are a plan, perspective and cross-sectional views respectively of an exemplary centrifugal weighted flywheel fifth wheel 5 in the exemplary embodiment of the present invention. With reference to FIGS. 1, 6, 7 and 8, in the exemplary embodiment, fifth wheel 5 is machined with harmonic balancing holes 15. Harmonic balancing holes 15 in the exemplary embodiment traverse the entire width of the weighted rim 55 of fifth wheel 5. Harmonic balancing holes 15 would be disposed around the weighted rim 55 of fifth wheel 5 so that the weight of the rim 55 of fifth wheel 5 would be harmonically balanced to contribute to smooth operation of the exemplary embodiment of the present invention. Further, once the gear box transmission 100 is in motion, exemplary centrifugal weighted flywheel 5 will tend to keep the gear box transmission 100 in motion. Exemplary flywheel 5 would be made with spokes as opposed to a solid center. The exemplary spoked flywheel 5 is illustrative and is not a limitation of the invention.

As depicted in FIG. 1, in the exemplary embodiment, sixth wheel 6 is a v-belt pulley wheel. In the exemplary embodiment, sixth wheel 6 has an outer diameter of 11.5 inches. In the exemplary embodiment, an opening 46 is provided at the center of sixth wheel 6. In the exemplary embodiment, opening 46 has a diameter of 0.75 inches.

In the exemplary embodiment, a third axle 11 is disposed through opening 46 of sixth wheel 6, through opening 45 of fifth wheel 5, and through opening 44 of fourth wheel 4. In the exemplary embodiment, third axle 11 is a drive axle with an outer diameter of 0.75 inches. In the exemplary embodiment, third axle 11 is disposed through openings 46, 45 and 44 of sixth, fifth and fourth wheels 6, 5, and 4 respectively such that fourth, fifth and sixth wheels 4, 5 and 6 respectively are mounted on third axle 11 and such that fifth wheel 5 is mounted between fourth wheel 4 and sixth wheel 6.

Figure 3:
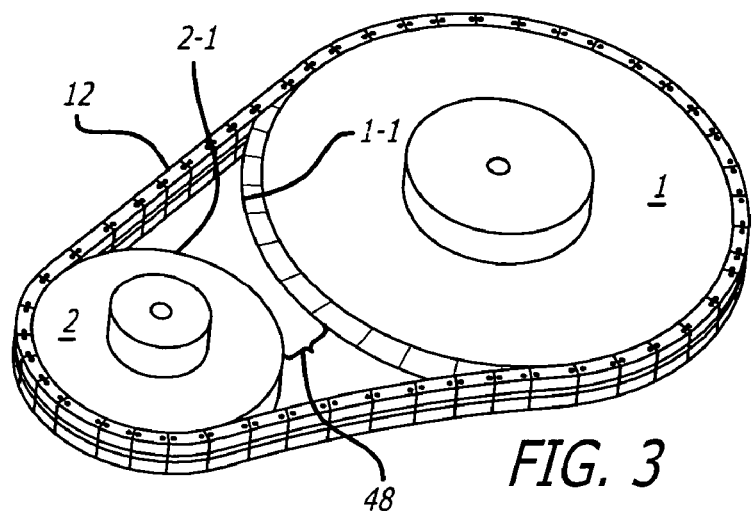
FIG. 3 is a perspective view of an exemplary geared sprocket chain interconnecting an exemplary first geared sprocket wheel and an exemplary second geared sprocket wheel in the exemplary embodiment of the present invention.

In the exemplary embodiment, a first interconnecting means 12 is interconnectably mounted to first wheel 1 and second wheel 2. In the exemplary embodiment, first interconnecting means 12 is a number 40 geared sprocket chain 12. FIG. 3 is a perspective view of an exemplary geared sprocket chain interconnecting an exemplary first geared sprocket wheel and an exemplary second geared sprocket wheel in the exemplary embodiment of the present invention. In FIG. 1, arrow-headed lines labeled 112 depict a direction in which the geared sprocket chain 12 will be driven in the exemplary embodiment.

In the exemplary embodiment, interconnecting first wheel 1 to second wheel 2 with geared sprocket chain 12 results in a turning ratio for second axle 10, and therefore of the gear wheels mounted on second axle 10, of 1:1.71 (one to 1.71). That is, for each revolution of first wheel 1, second axle 10, and therefore the gear wheels mounted on second axle 10, revolve 1.71 times. Interconnected first wheel 1 with second wheel 2 is sometimes referred to herein as stage one, or the first gear stage.

Figure 4:
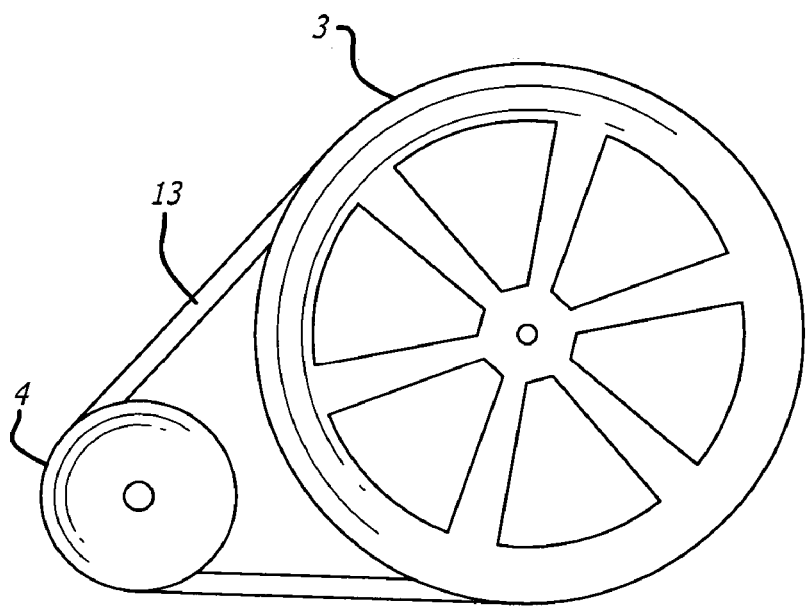
FIG. 4 is a plan view of an exemplary first v-belt interconnecting exemplary third and fourth wheels in the exemplary embodiment of the present invention.

In the exemplary embodiment, a second interconnecting means 13 is provided. In the exemplary embodiment, second interconnecting means 13 is a 0.5 inch v-belt (17480). FIG. 4 is a plan view of an exemplary first v-belt 13 interconnecting exemplary third and fourth wheels, 3 and 4 respectively, in the exemplary embodiment of the present invention. Arrow-headed lines labeled 113 in FIG. 1 depict a direction in which exemplary first v-belt 13 would be driven in the exemplary embodiment.

Figure 5:
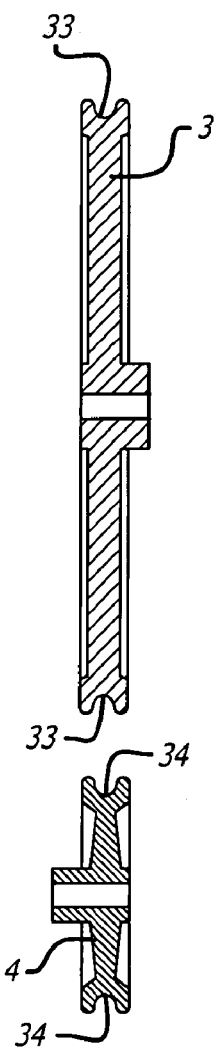
FIG. 5 is a cross-sectional view of exemplary third and fourth wheels in the exemplary embodiment of the present invention.

FIG. 5 is a cross-sectional view of exemplary third and fourth wheels, 3 and 4 respectively, in the exemplary embodiment of the present invention. As depicted in FIG. 5, grooves 33 in wheel 3, and 34 in wheel 4, are provided for receiving exemplary v-belt 13, as depicted in FIG. 4.

In the exemplary embodiment, interconnecting third wheel 3 to fourth wheel 4 with interconnecting means 13 results in a turning axle ratio of 1:3.93 (one to 3.93). That is, for each revolution of first wheel 1, third axle, and therefore the gear wheels mounted on third axle 11, revolves/revolve 3.93 revolutions. Interconnected third wheel 3 with fourth wheel 4 is sometimes referred to herein as stage two, or the second gear stage.

In the exemplary embodiment, as depicted in FIG. 1, a third interconnecting means 14 is provided. In the exemplary embodiment, third interconnecting means 14 is a 0.5 inch v-belt (15405).

Figure 9:
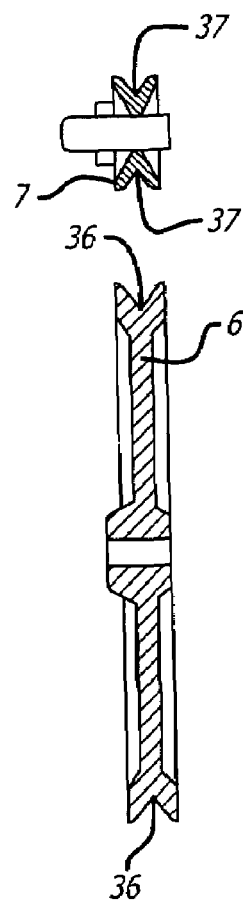
FIG. 9 is a cross-sectional view of an exemplary sixth wheel and an exemplary alternator pulley wheel in the exemplary embodiment of the present invention.

FIG. 9 is a cross-sectional view of an exemplary sixth wheel 6 and an exemplary alternator pulley wheel 7 in the exemplary embodiment of the present invention. As depicted in FIG. 9, grooves 36 in wheel 6 and 37 in alternator pulley wheel 7 are provided for receiving a v-belt, such as v-belt 14.

Figure 10:
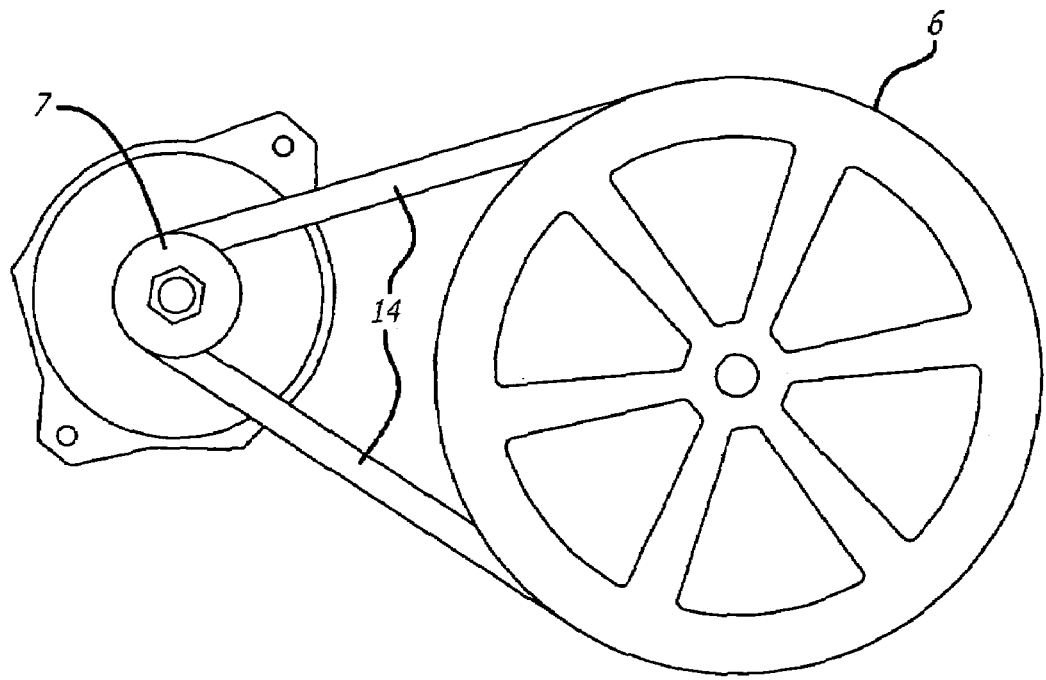
FIG. 10 is a plan view of an exemplary v-belt interconnecting the exemplary sixth wheel and the exemplary alternator pulley wheel in the exemplary embodiment of the present invention.

FIG. 10 is a plan view of an exemplary v-belt 14 interconnecting the exemplary sixth wheel 6 and the exemplary alternator pulley wheel 7 in the exemplary embodiment of the present invention. Interconnected sixth wheel 6 with alternator pulley wheel 7 is sometimes referred to herein as stage three, or the third gear stage.

As depicted in FIG. 10, in the exemplary embodiment, third interconnecting means 14 interconnects sixth wheel 6 to alternator pulley wheel 7. As previously mentioned above, in the exemplary embodiment, alternator pulley wheel 7 is a factory-set alternator v-belt pulley wheel with a 3.5 inch outer diameter. In FIG. 1, arrow-headed lines labeled 114 depict a direction in which third interconnecting means 14 would be driven in the exemplary embodiment.

In the exemplary embodiment, interconnecting sixth wheel 6 to alternator pulley wheel 7 with interconnecting means 14 results in a turning pulley wheel ratio for alternator pulley wheel 7 of 1:12.91 (one to 12.91). That is, for each revolution of first wheel 1, alternator pulley wheel 7 will revolve 12.91 times.

The interconnected wheels (elements 1 through 6; and 9 through 15) described above are sometimes collectively referred to herein as the gear-to-gear transmission assembly 100, or simply, the gear box transmission 100.

FIG. 11 is a schematic diagram of exemplary electrical components of the exemplary embodiment of the present invention. As depicted in FIG. 11, the alternator 8 is connected to a battery 22, which in the exemplary embodiment is a 12-volt battery. The battery 22 is connected to an inverter 27, which in the exemplary embodiment is a 110/120 AC 400 W inverter. According to the connection between the alternator 8, the battery 22, and the inverter 27, when electrical power is needed/being used through inverter 27, the power is obtained from battery 22. When more power is being generated through alternator 8 than is used through inverter 27, the power is stored in battery 22.

FIG. 12 is block diagram of exemplary electrical components of the exemplary embodiment of the present invention. As depicted in FIG. 12, the gear-to-gear transmission assembly/gear box transmission 100 is connected to the alternator 8, which is in turn connected, with a fuse 62 and an on/off switch 67, to battery 22, which is in turn connected to inverter 27. A voltmeter gauge 23 and a battery level meter 30 could be provided for readings. As depicted in FIG. 12, a household device or other appliance needing 110/120 household AC current could be connected to and run from electrical energy/power provided through inverter 27. Alternatively, battery 22 could also provide 12-volt output 38 for connection to devices, such as, for example, 12-volt automotive devices to power such devices.

As depicted in FIG. 12, human power 28 could be used to operate the gear box transmission 100 via foot pedals 5 (specifically, a foot pedal 18 mounted on a pedal arm 17), via a stair-stepper mode 77, 78, or via an adapter 79 that would adapt rotary gym equipment, such as exercise bicycles, to power the device.

Figure 2B:
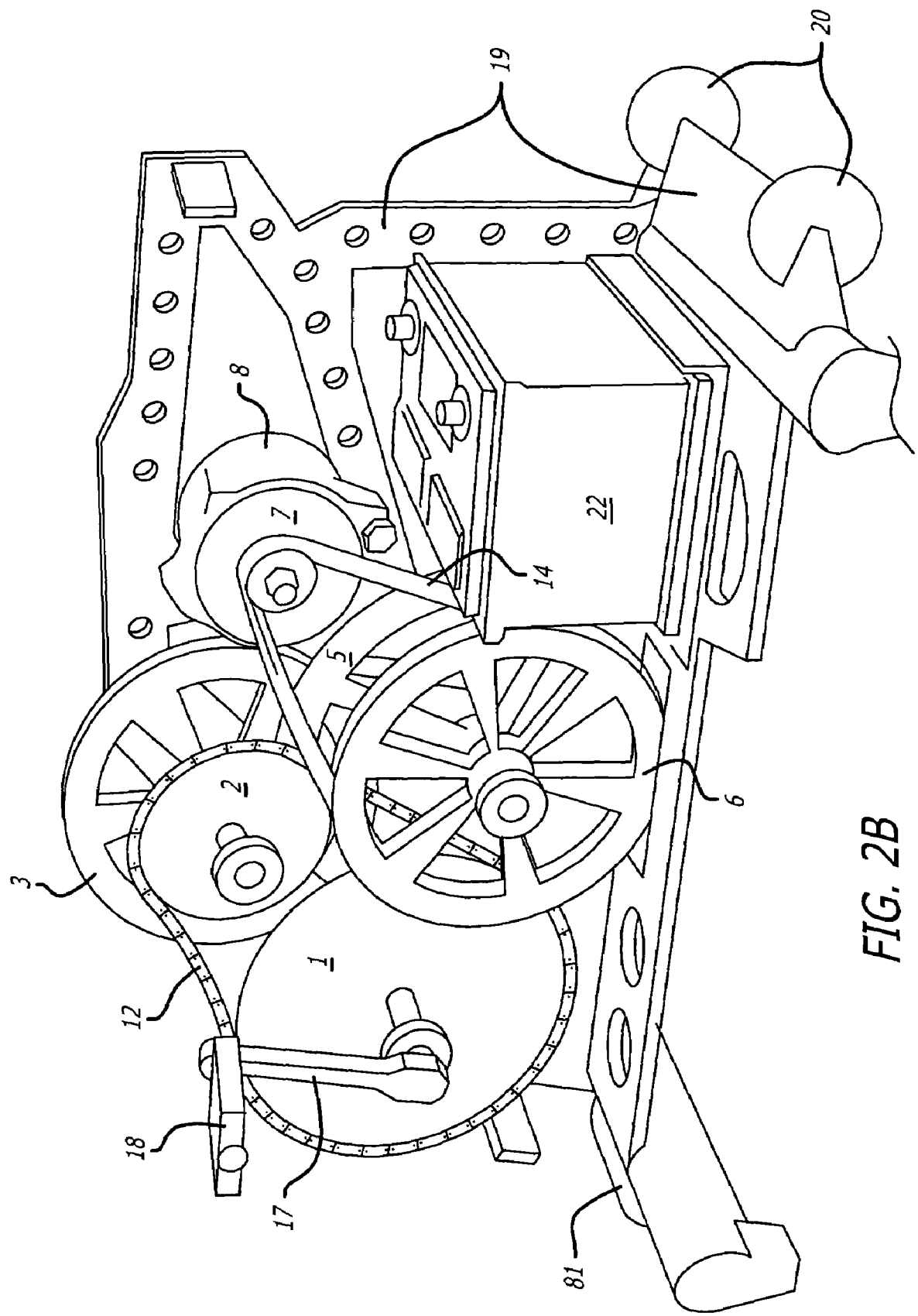
FIG. 2B is a perspective view of a right side of an assembled exemplary gear box transmission of the exemplary device for converting human power to electrical power in the exemplary embodiment of the present invention.
Figure 2C:
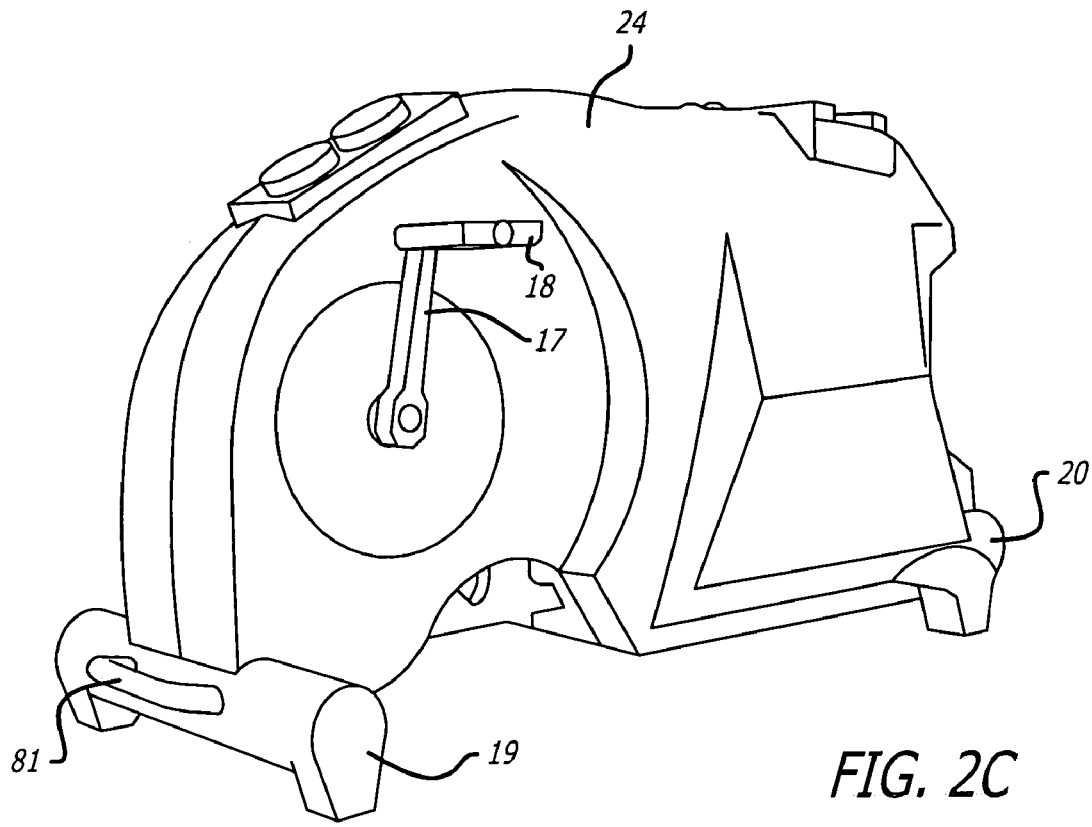
FIG. 2C is a perspective view of a right side of a fully-assembled exemplary device for converting human power to electrical power in the exemplary embodiment of the present invention.
Figure 2D:
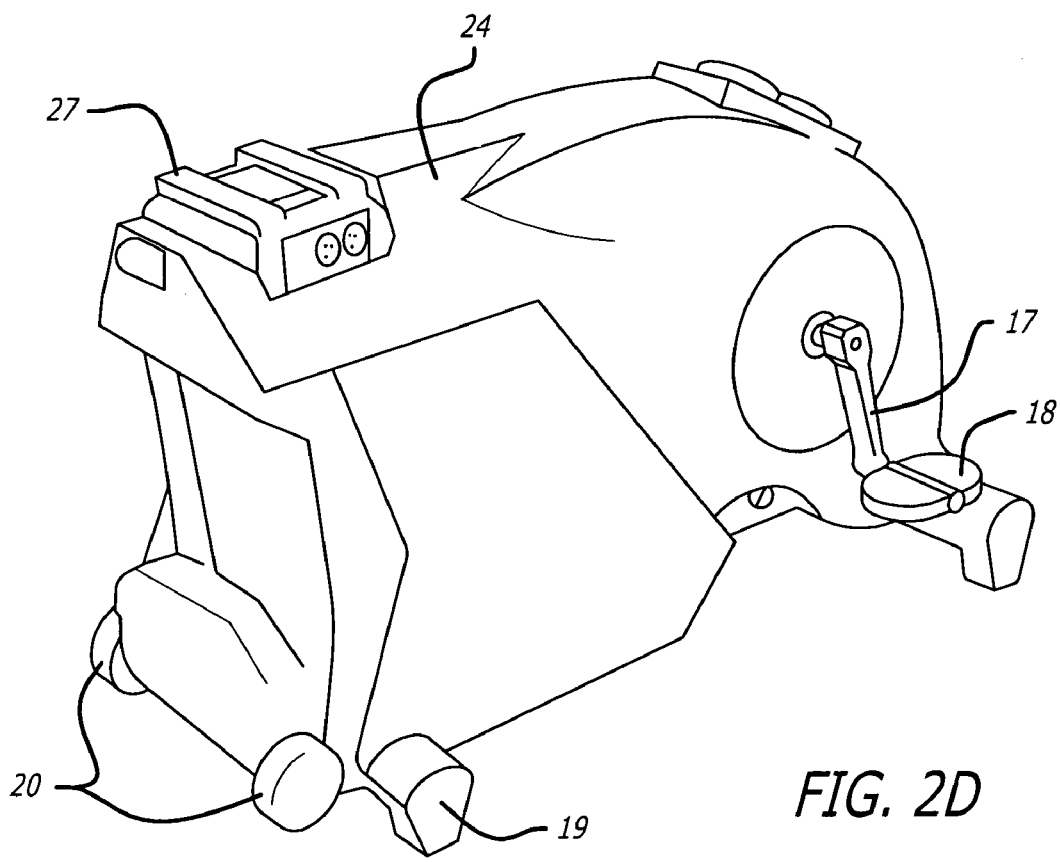
FIG. 2D is a perspective view of a left side of a fully-assembled exemplary device for converting human power to electrical power in the exemplary embodiment of the present invention.
Figure 2E:
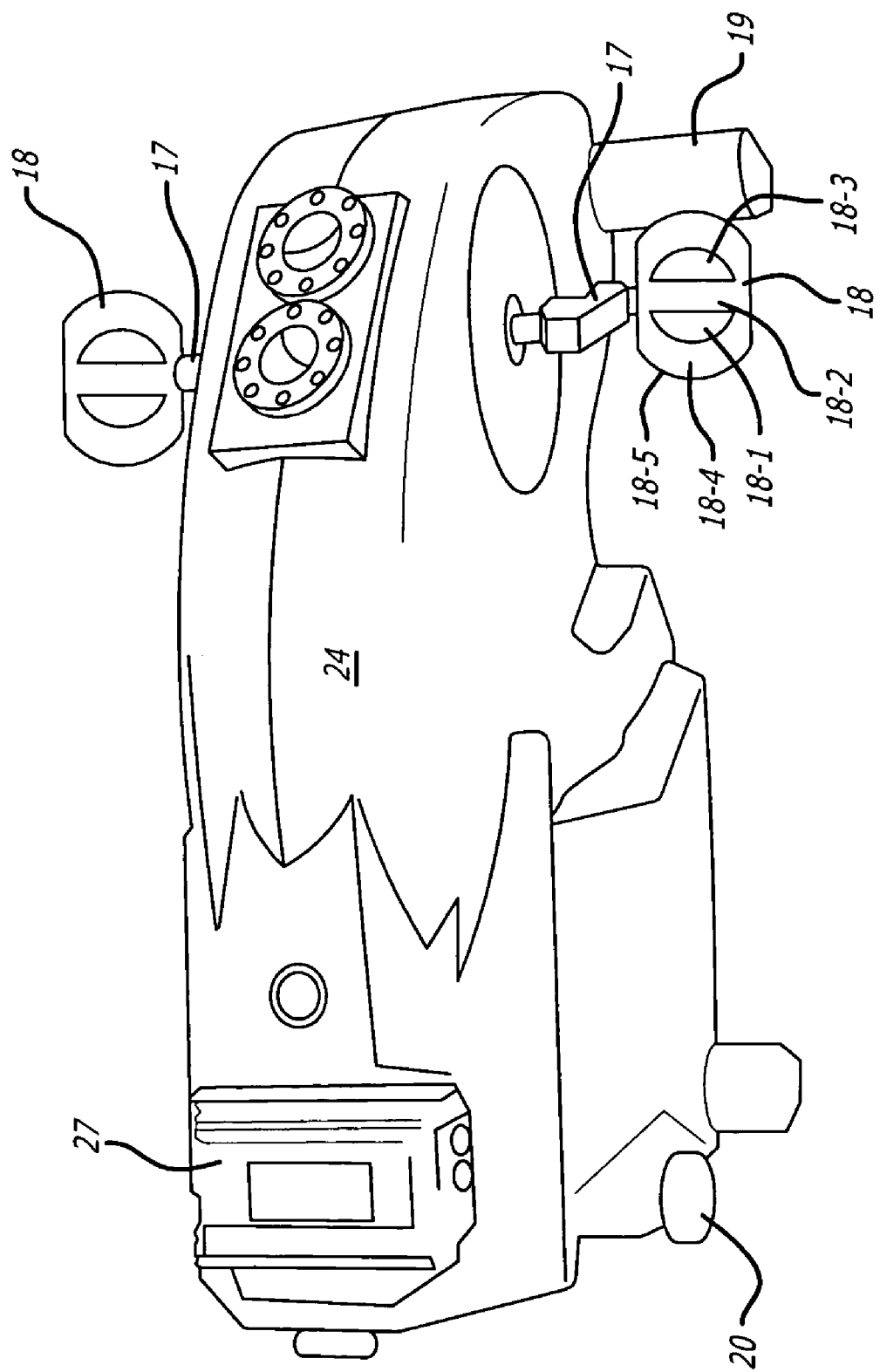
FIG. 2E is a perspective top view of a fully-assembled exemplary device for converting human power to electrical power in the exemplary embodiment of the present invention.

In the exemplary embodiment, it should be noted that the "foot" pedals 18 are adapted for use as either foot pedals, in which case a human foot would rest on top of the pedal, or as a hand pedal. With reference to FIG. 2E, each pedal of the exemplary embodiment provides a central cross-piece 18-2 which is adapted for receiving an arch of a human foot, or a palm of a human hand. A first opening 18-1 is adapted for receiving four fingers (index, middle, ring, and little fingers) of the human hand. A second opening 18-3 is adapted for receiving a thumb of the human hand. An inwardly sloping (sloping downwardly from the exterior perimeter 18-5 toward the center cross-piece 18-2) oblong ring 18-4 for cradling a ball and a heel of a human foot.

Figure 17:
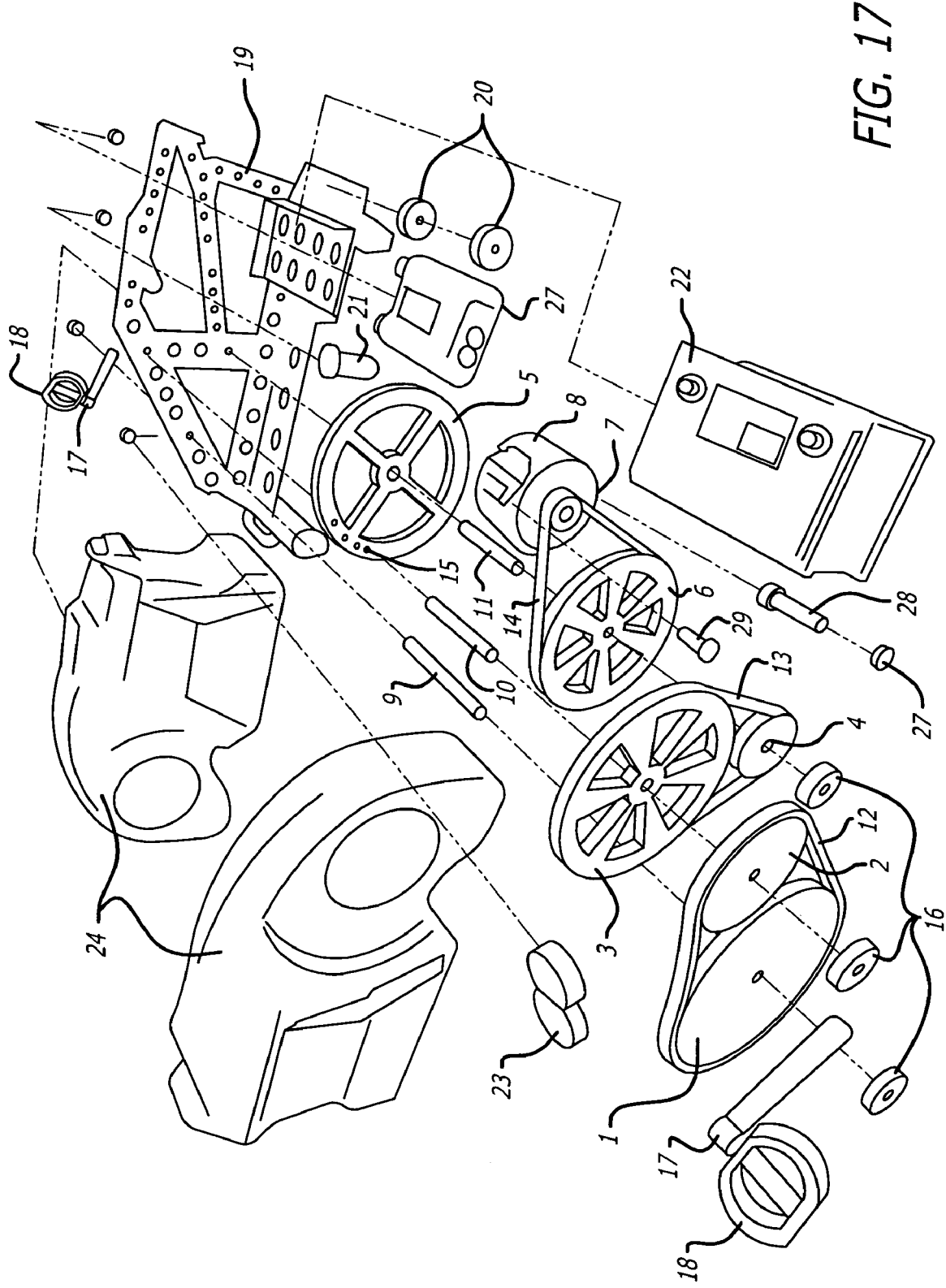
FIG. 17 is a perspective view of an unassembled exemplary embodiment of the present invention.

As depicted in e.g., FIGS. 2C, 2D, 2F and 17, the entire gear-to-gear transmission assembly/gear box transmission 100 is housed in the exemplary embodiment in a housing 24. As depicted in FIGS. 2A, 2B and 17, the entire gear-to-gear transmission assembly/gear box transmission 100 is mounted on a structural grid framework 19. Wheels 20 are mounted on structural grid framework 19 so that the entire device can be rolled on wheels 20. A handle 81 is provided. Most of the weight of the exemplary device is mounted near the wheels 20. Accordingly, the weight at the handle-end 81 of the device is fairly light. In one embodiment, handle 81 is a telescoping/retractable handle, such as is available for luggage—the telescoping shafts would be held in the framework underneath the device.

In order to use the exemplary device, a human user of the exemplary device could sit in a chair and place the entire housed gear-to-gear transmission assembly 100 in front of the chair. The human user would then place the user's respective feet on the respective exemplary foot pedals 18 and pedal the device in a bicycle-pedaling mode.

In order to generate a 12.5 voltage output on the alternator, approximately 1100 revolutions per minute (RPMs) of the alternator pulley wheel 7 are needed.

If the human user were to then pedal seventy (70) revolutions per minute, the above-described gear-to-gear ratio of the entire assembly (1:12.91) would result in 875 revolutions per minute of the alternator pulley wheel 7.

If the human user were to pedal ninety (90) revolutions per minute, the above-described gear-to-gear ratio of the entire assembly (1:12.91) would result in 1125.9 revolutions per minute of the alternator pulley wheel 7.

Therefore, with a moderate level of pedaling, averaging ninety (90) revolutions per minute or so, the 1100 RPMs necessary to achieve a 12.5 voltage output on the alternator would be achieved.

The revolutions per minute of the human user (e.g., 90) are multiplied by the exemplary gear-to-gear transmission assembly 100. The multiplication of power is accomplished by the exemplary ratios of the outer diameters of the various interconnected wheels, including the alternator pulley wheel. Specifically, in the exemplary embodiment, a larger wheel 1 with an outer diameter of twelve (12) inches is used to drive, via the geared sprocket chain 12, a smaller wheel 2 with an outer diameter of only seven (7) inches. It is the outer diameter ratio of the two wheels (12/7) that results in the multiplication of one revolution of wheel 1 resulting in 1.71 revolutions of wheel 2.

In the exemplary embodiment, wheel 2 with an outer diameter of only seven (7) inches, is connected via drive axle 10 to a much larger wheel 3 with an outer diameter of 11.5 inches. By virtue of the axle 10 connection of smaller wheel 2 to larger wheel 3, each revolution of wheel 1 results in 1.71 revolutions of not only wheel 2, but also of larger wheel 3.

In the exemplary embodiment, larger wheel 3 is then connected with v-belt 13 to smaller wheel 4 with an outer diameter of only five (5) inches. The outer diameter ratio of wheel 3 as compared to wheel 4 (11.5/5) results in the multiplication of one revolution of wheel 3 resulting in 2.3 revolutions of wheel 4. Therefore, for each revolution of wheel 1, wheel 4 revolves 3.93 times (1.71 times 2.3).

In the exemplary embodiment, smaller wheel 4 is connected via drive axle 11 to both flywheel 5 and larger wheel 6. By virtue of the drive axle 11 connection of smaller wheel 4 to larger wheel 6, for each revolution of wheel 4, wheel 6 also revolves one time. In the exemplary embodiment, wheel 6 has an outer diameter of 11.5 inches. Wheel 6 is connected to alternator pulley wheel 7 via v-belt 14. Alternator pulley wheel 7 has an outer diameter of only 3.5 inches. Therefore, for each complete revolution of wheel 6, alternator pulley wheel 7 will revolve 3.285 times (11.5/3.5=3.285). Therefore, for each complete revolution of wheel 1, alternator pulley wheel 7 will revolve 12.91 times (1.71 times 2.3 times 3.285=12.91).

It will be understood by someone with ordinary skill in the art that varying the outer diameters of the various interconnected wheels and the alternator pulley wheel could result in higher or lower RPMs as the case may be.

For example, in an alternative embodiment, fifth wheel flywheel 5 could be modified to itself accept an interconnecting means, such as a v-belt. In such an embodiment, a v-belt would interconnect fifth wheel flywheel 5 to alternator pulley wheel 7. Such a modification would result in an overall turn ratio of 1:16.51 for the gear-to-gear transmission assembly 100. The 1:16.51 ratio would achieve 1320.80 RPMs for 80-pedal-revolutions of wheel 1 per minute.

In a further alternative embodiment, wheel 6 would be provided with a sixteen inch outer diameter; the flywheel would be removed from between wheel 6 and wheel 4 and would be mounted instead to alternator pulley wheel 7.

Compactness of the gear box transmission 100 is achieved in the exemplary embodiment by pairing large wheels with smaller wheels which are in turn connected via drive axles to larger wheels. As can be seen in, e.g., FIG. 3, the outer rim 1-1 of wheel 1 is separated from the outer rim 2-1 of wheel 2 by a distance 48.

Figure 13A:
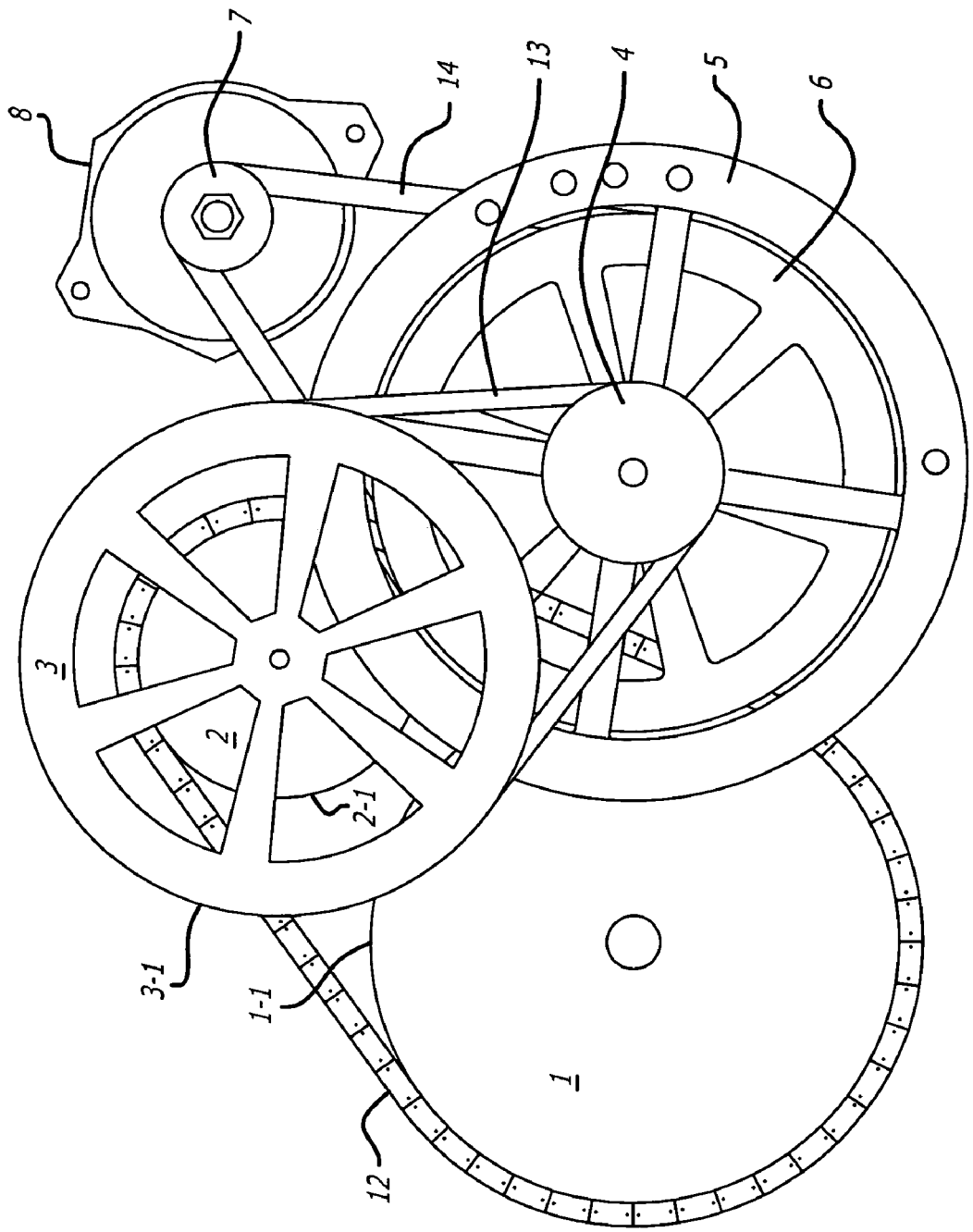
FIG. 13A is a right side plan view depicting exemplary layers of gears in the exemplary embodiment of the present invention.
Figure 13B:
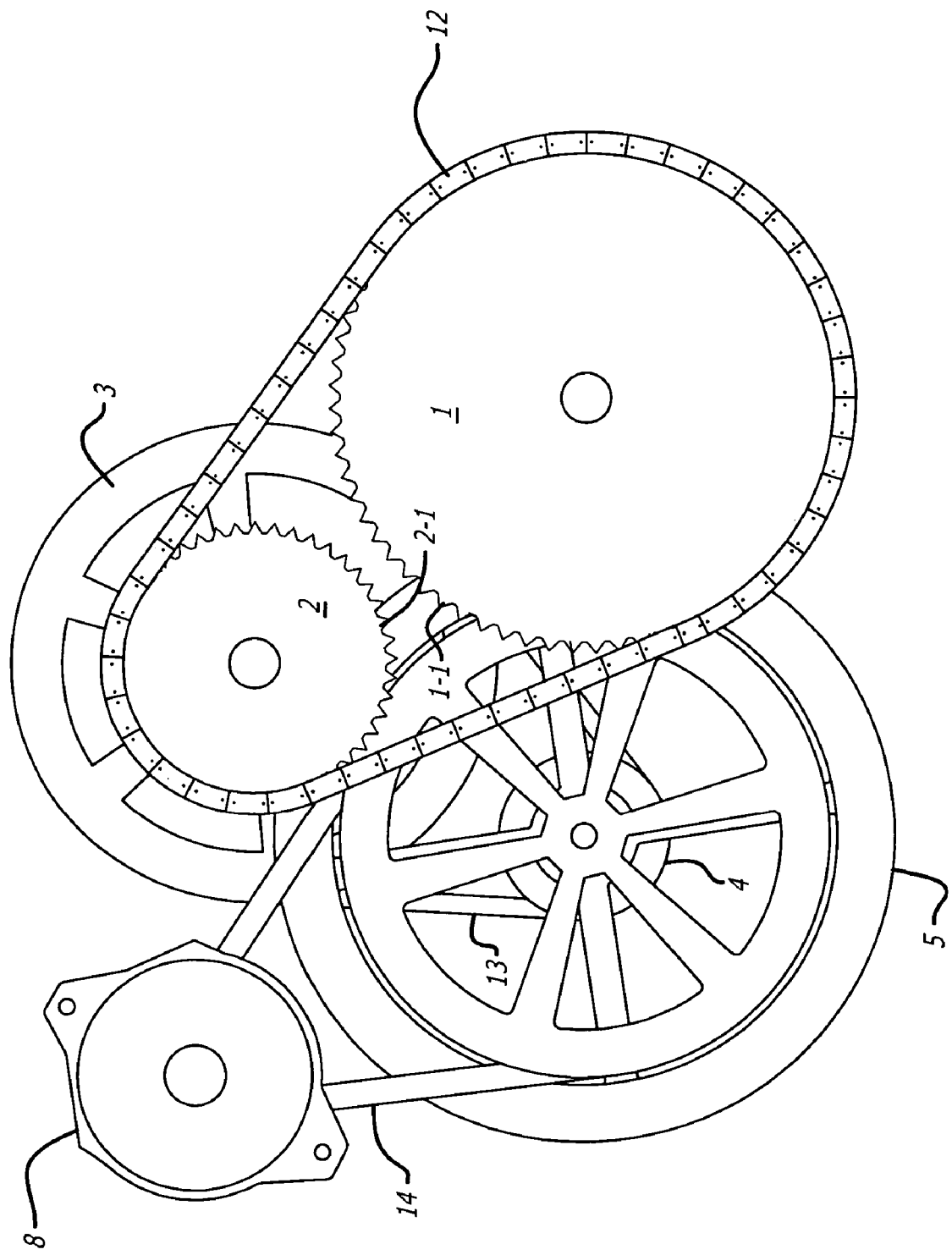
FIG. 13B is a left side plan view depicting exemplary layers of gears in the exemplary embodiment of the present invention.

FIGS. 13A and 13B depict compact layering of the three gear stages (stages one, two and three) of the exemplary embodiment. FIG. 13A is a right side plan view depicting exemplary layers of gears in the exemplary embodiment of the present invention. FIG. 13B is a left side plan view depicting exemplary layers of gears in the exemplary embodiment of the present invention.

Because the outer diameter of wheel 3 (in the exemplary embodiment, 11.5 inches) is smaller than the diameter of wheel 1 (in the exemplary embodiment, 12 inches), and because the outer rim 1-1 of wheel 1 is separated from the outer rim 2-1 of wheel 2 by a distance 48 (see FIG. 3), side-by-side mounting of wheel 3 on a common axle (10) with wheel 2 does not result in an interfering overlap with respect to the position of wheel 1 or with mechanical-operating means attached to an axle (9) mounted in wheel 1.

Similarly, the assembly of wheels 4, 5 and 6 on a single axle 11, and aligning the rim of wheels 4 and 3 for receipt of v-belt 13 does not result in any interference as between wheels 3, 4, 5 and/or 6, or with respect to wheels 2 and 1.

The exemplary device and its gear ratios balance high front-end torque with high-speed low torque at the back-end of the device. Alternative gear ratios could be used without departing from the spirit of the invention, but could result in alternative front-end torque or back-end speed. (Reference to the front-end of the device is meant to refer to the wheel 1/handle 81 end of the device; reference to the back-end of the device is meant to refer to the alternator 8/battery 22 end of the device).

Figure 21:
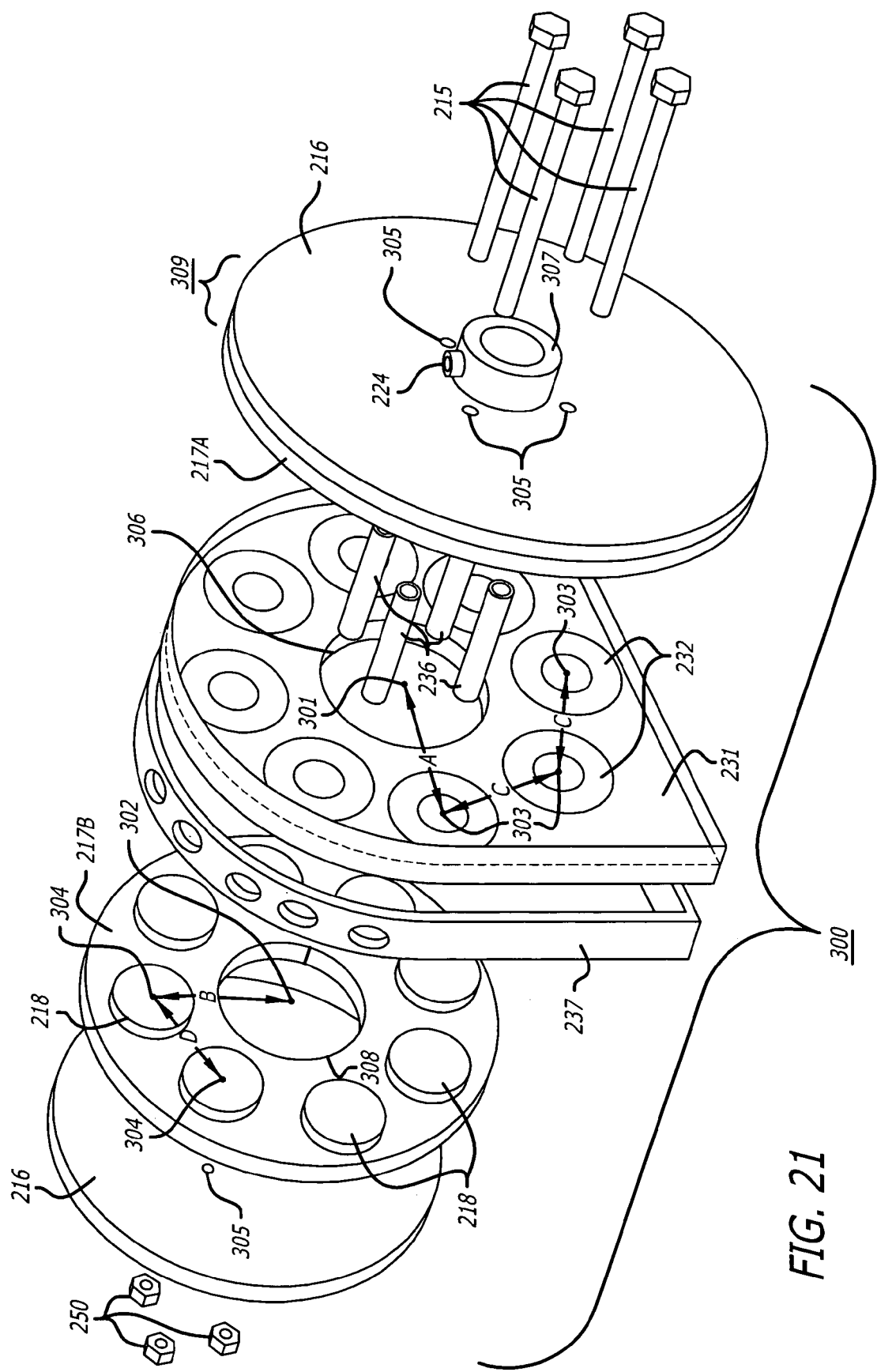
FIG. 21 is an exploded perspective view of exemplary components of an exemplary permanent magnet generator assembly of the further alternative exemplary device in the exemplary PMG embodiment of the present invention.
Figure 22:
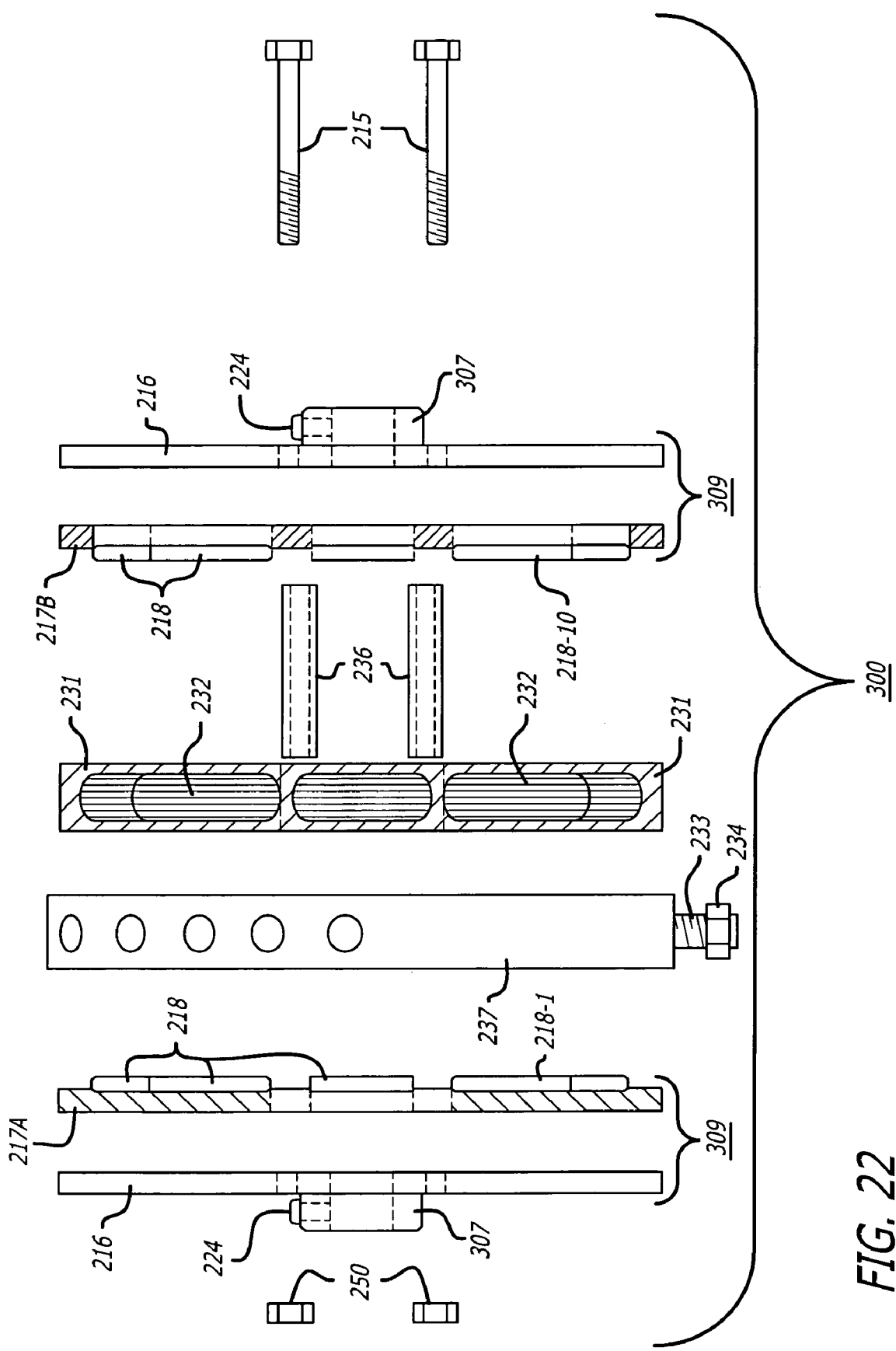
FIG. 22 is an exploded front plan view of exemplary components of the exemplary permanent magnet generator assembly of the further alternative exemplary device in the exemplary PMG embodiment of the present invention.
Figure 30:
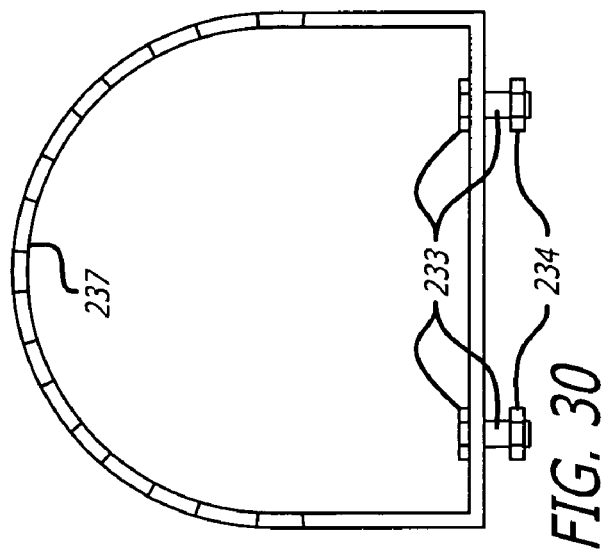
FIG. 30 is a side plan view of an exemplary stator casing in the further alternative exemplary device in the exemplary PMG embodiment of the present invention.
Figure 29:
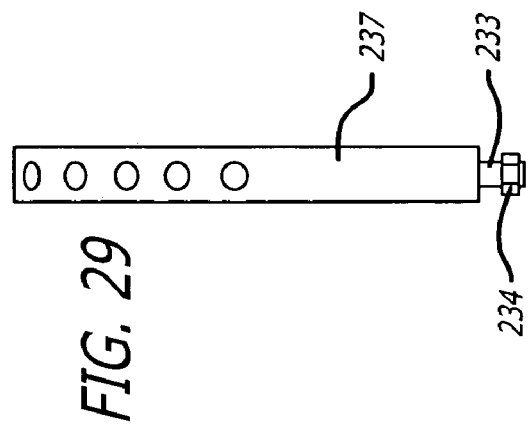
FIG. 29 is a front plan view of an exemplary stator casing in the further alternative exemplary device in the exemplary PMG embodiment of the present invention.
Figure 28:
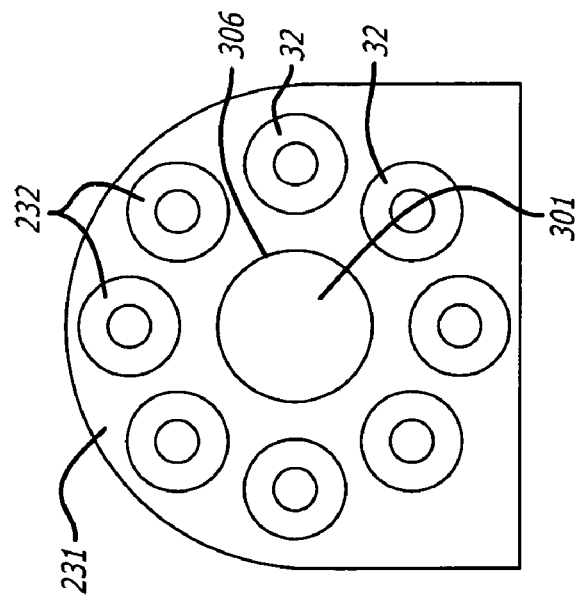
FIG. 28 is a side plan view of an exemplary stator in the further alternative exemplary device in the exemplary PMG embodiment of the present invention.
Figure 27:
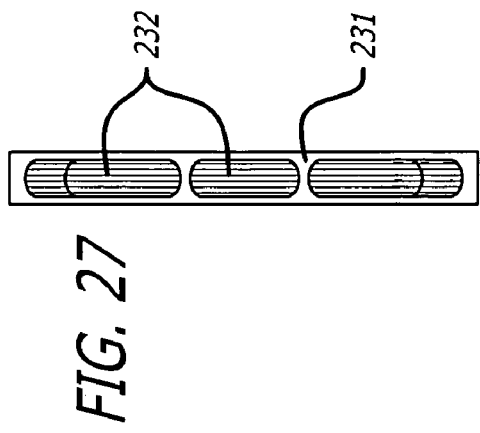
FIG. 27 is a cross-sectional front view of an exemplary stator in the further alternative exemplary device in the exemplary PMG embodiment of the present invention.

A yet further alternative exemplary embodiment (sometimes referred to herein as the "PMG embodiment" or as the "exemplary PMG embodiment") of the present invention is described. In the exemplary PMG embodiment of the present invention, instead of a simple flywheel gearwheel (element 5, e.g., FIG. 1) and a separate, self-contained alternator (element 8, e.g., FIG. 1) (such as an automotive alternator) as was employed in the exemplary embodiment, an exemplary permanent magnet generator (also sometimes referred to herein as a "PMG") assembly 300 such as is depicted in FIGS. 21 and 22, is used. In the exemplary PMG embodiment of the present invention, a portion of the permanent magnet generator assembly 300 acts as one of the gear wheels. Further, the permanent magnet generator assembly 300, when operated, generates electrical power in the form of alternating current (AC). Therefore, because it generates electrical power in the form of alternating current, the permanent magnet generator assembly 300 is an "alternator". Accordingly, as compared to a simple flywheel gearwheel (element 5, e.g., FIG. 1) and a separate, self-contained alternator (element 8, e.g., FIG. 1) (such as an automotive alternator) as was employed in the exemplary embodiment, in the exemplary PMG embodiment of the present invention, the alternator is integral to the gear wheel comprising, in part, the permanent magnet generator assembly 300.

The permanent magnet generator assembly 300 will generate low voltage, "three phase" AC. In the exemplary PMG embodiment of the present invention, as will be discussed further below, the alternating current generated by operating the permanent magnet generator assembly 300 will be changed into "direct current" (DC) for charging a 12 volt battery (See, e.g., element 243, FIG. 18).

Figure 18:
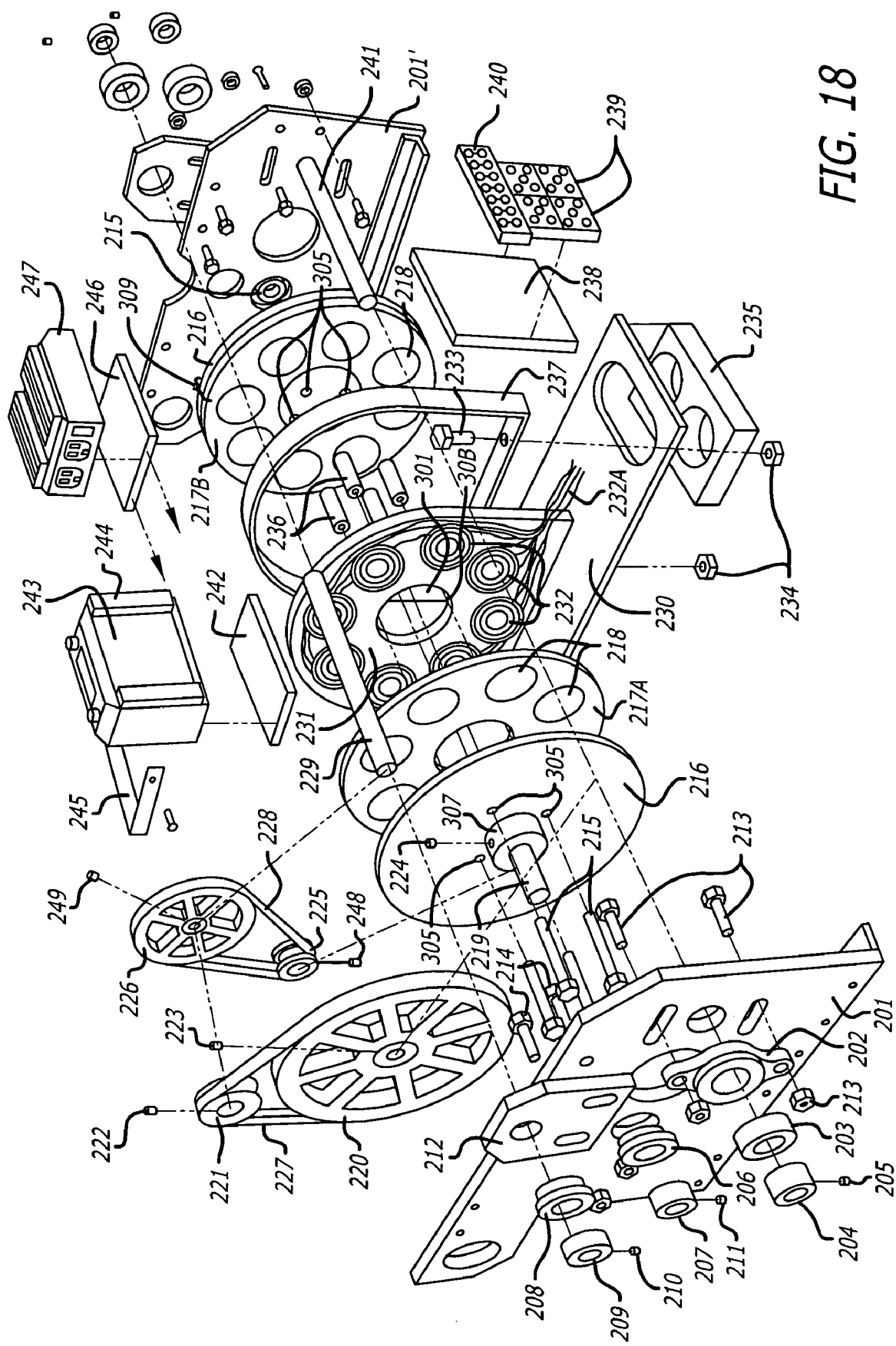
FIG. 18 is an exploded perspective view of further alternative exemplary gear box transmission components of a further alternative exemplary device for converting human power, or mechanical power, to electrical power in a yet further alternative exemplary embodiment (sometimes referred to herein as the "PMG embodiment" or the "exemplary PMG embodiment") of the present invention.

FIG. 18 is an exploded perspective view of further alternative exemplary gear box transmission components, including the exemplary permanent magnet generator assembly 300, of the further alternative exemplary device for converting human power, or mechanical power, to electrical power in the exemplary PMG embodiment of the present invention.

Returning with reference to FIGS. 21 and 22, the exemplary permanent magnet generator assembly element 300 comprises a stator 231 and two rotors (217a and 217b). (Reference herein to a rotor 217 will be understood to apply to each of the two rotors 217a and 217b).

The stator 231 of the exemplary PMG assembly 300 comprises a high-temperature epoxy into which is imbedded a plurality of coils 232 of wire; a center hole 306 of stator 231 is provided. In the exemplary permanent magnet generator assembly 300, eight coils 232 of wire are provided. In the exemplary PMG assembly 300, each coil 232 comprises two-hundred (200) winds of 16-gauge coated magnet wires.

Each coil 232 forms substantially a circle with a center point 303; each coil 232 measures approximately one-and-one-half inches in diameter. In the exemplary PMG assembly 300, the coils 232 are imbedded in the stator equidistant from a center point 301 of the stator 231 so that the center point 303 of each coil 232 is substantially the same distance from center point 301 of the stator 231. The distance that the center point 303 of a coil 232 is positioned from center point 301 will be referred to as "Radius A."

In the exemplary PMG assembly 300, each coil 232 is separated from a coil 232 on either side by a substantially standard distance, referred to herein as "Distance C." In the exemplary PMG assembly 300, the center point 303 of a first coil 232 is Distance C from the center point 303 of each coil 232 on either side of the first coil 232.

In the exemplary PMG assembly 300, the stator 231 is encased around its perimeter in an aluminum stator casing 237; the exemplary aluminum stator casing 237 comprises aluminum that is approximately one-eighth of an inch thick, and is approximately one inch wide.

In the exemplary PMG assembly 300, each rotor 217 comprises a high-temperature epoxy into which is imbedded eight permanent magnets 218. In the exemplary PMG assembly 300, each rotor 217 comprises a disk of epoxy that measures approximately twelve inches in diameter having a center 302. In the exemplary PMG assembly 300, a center hole 308 is provided in each rotor 217.

In the exemplary PMG assembly 300, each permanent magnet 218 comprises a high-quality neodymium magnet measuring approximately one-half inch thick, and one-and-one-half inch in diameter with a center 304. In the exemplary PMG assembly 300, the permanent magnets 218 are imbedded in the respective rotor 217 at a substantially standard distance; the substantially standard distance is measured from the center 302 of the rotor 217 to the respective center 304 of each of the respective permanent magnets 218. The substantially standard distance that the center point 304 of a permanent magnet 218 is positioned from center 302 of the respective rotor 217 will be referred to as "Radius B."

In the exemplary PMG assembly 300, the permanent magnets 218 are imbedded in the respective rotor 217, alternating face-up poles. For example, as depicted in FIG. 25A, magnets 218-1, 218-3, 218-5 and 218-7 would be imbedded in the epoxy rotor 217a so that a north pole would be face up; magnets 218-2, 218-4, 218-6 and 218-8 would be imbedded in the epoxy rotor 217a so that a south pole would be face up. In rotor 217b, as depicted in, e.g., FIG. 25B, magnets 218-10, 218-12, 218-14, and 218-16 would be imbedded in the epoxy rotor 217b so that a south pole would be face up; magnets 218-11, 218-13, 218-15 and 218-17 would be imbedded in the epoxy rotor 217b so that a north pole would be face up.

In the exemplary PMG assembly 300, the center 304 of a first permanent magnet 218 is separated from the center 304 of a permanent magnet 218 on either side of the first permanent magnet 218 by a substantially standard distance, referred to herein as "Distance D." In the exemplary PMG assembly 300, the center 304 of the first permanent magnet 218 is Distance D from the center 304 of each permanent magnet 0.218 on either side of the first permanent magnet 218.

In the exemplary PMG assembly 300, Distance C is approximately equal to Distance D; Radius A is approximately equal to Radius B. Accordingly, in the exemplary PMG assembly 300, when rotor 217a is placed (such as depicted, e.g., in FIGS. 18, 21, and 22) so that the magnets 218 of rotor 217a are facing the magnets 218 of rotor 217b, and when the magnets 218 of rotor 217a are aligned with the magnets 218 of rotor 217b so that the magnets 218 of rotor 217a are counter-posed to the magnets 218 of rotor 217b, rotor 217a is substantially a visual mirror image of rotor 217b, and vice versa.

Even though when the magnets 218 of rotor 217a are counter-posed to the magnets 218 of rotor 217b, rotor 217a is substantially a visual mirror image of rotor 217b, the magnets of rotor 217a must be opposite in face-up pole from the corresponding counter-posed magnets 218 of rotor 217b. That is, a first magnet 218-1 (See FIG. 25A) of rotor 217a must attract a second, counter-posed magnet 218-10 (See FIG. 25B) of rotor 217b.

In the exemplary PMG assembly 300, each rotor 217 is mounted to a respective steel plate 216. In the exemplary PMG assembly 300, the steel plate 216 is made of stainless steel. Stainless steel is used in the exemplary embodiment because it is not magnetic and because it does not spoil the effect of the magnets 218.

In the exemplary PMG assembly 300, each steel plate 216 measures approximately one-quarter inch (¼") in thickness and measures approximately twelve inches in diameter. In the exemplary PMG assembly 300, each steel plate 216 provides a stop collar 307 that is welded in a center of the respective steel plate 216; each steel plate 216 provides four holes 305 through which bolts can be threaded. In the exemplary PMG assembly 300, the stop collar 307 measures approximately three-quarters of an inch (¾") in thickness. In the exemplary PMG assembly 300, four fine thread bolts 215 are provided, each measuring approximately one-quarter inch (¼") in diameter, and measuring approximately three inches (3") long.

In the exemplary PMG assembly 300, in order to maintain the mirror-image, counter-posed-attraction relationship as described above between the magnets 218 of rotor 217a and the magnets 218 of rotor 217b, each rotor 217 is mounted to a respective steel plate 216 to form a rotor 217/steel plate 216 assembly 309 (see, e.g., FIGS. 18, 21, 22, 25A and 25B). Four bolts 215 are fitted through the four respective holes 305 of a first rotor 217/steel plate 216 assembly 309 (see, e.g., FIGS. 18, 21, 22, 25A and 25B), e.g., the assembly 309 comprising rotor 217b and a respective steel plate 216. The four bolts 215 are slid through four respective spacing bars 236 that are extended through the inside of the perimeter of hole 306 in the stator 231. The ends of the four bolts 215 are then threaded through the four holes 305 in the other rotor/plate assembly 309 (e.g., the assembly 309 comprising rotor 217a and a respective steel plate 216). The threaded ends of each the four bolts 215 are each secured with a nut 250, such as in the exemplary PMG assembly 300, a one-quarter inch (¼") nyloc nut 250.

With reference to FIG. 18, in the exemplary PMG assembly 300, a shaft 219 is inserted through the stop collar 307 and hole 308 in a first rotor/plate assembly 309, e.g., rotor 217a/plate 216, through the center of the hole 306 in the stator 231, and through the hole 308 and stop collar 307 of a second rotor/plate assembly 309, e.g., rotor 217b/plate 216. A set screw 224 is threaded through each stop collar 307 to hold the shaft 219 in the exemplary PMG assembly 300.

With reference to FIG. 18, each end of shaft 219 is rotatably anchored in opposing sides of aluminum framework casing 201 and 201' respectively, using a bearing with stop ring 206 on each end of shaft 219.

Figure 20:
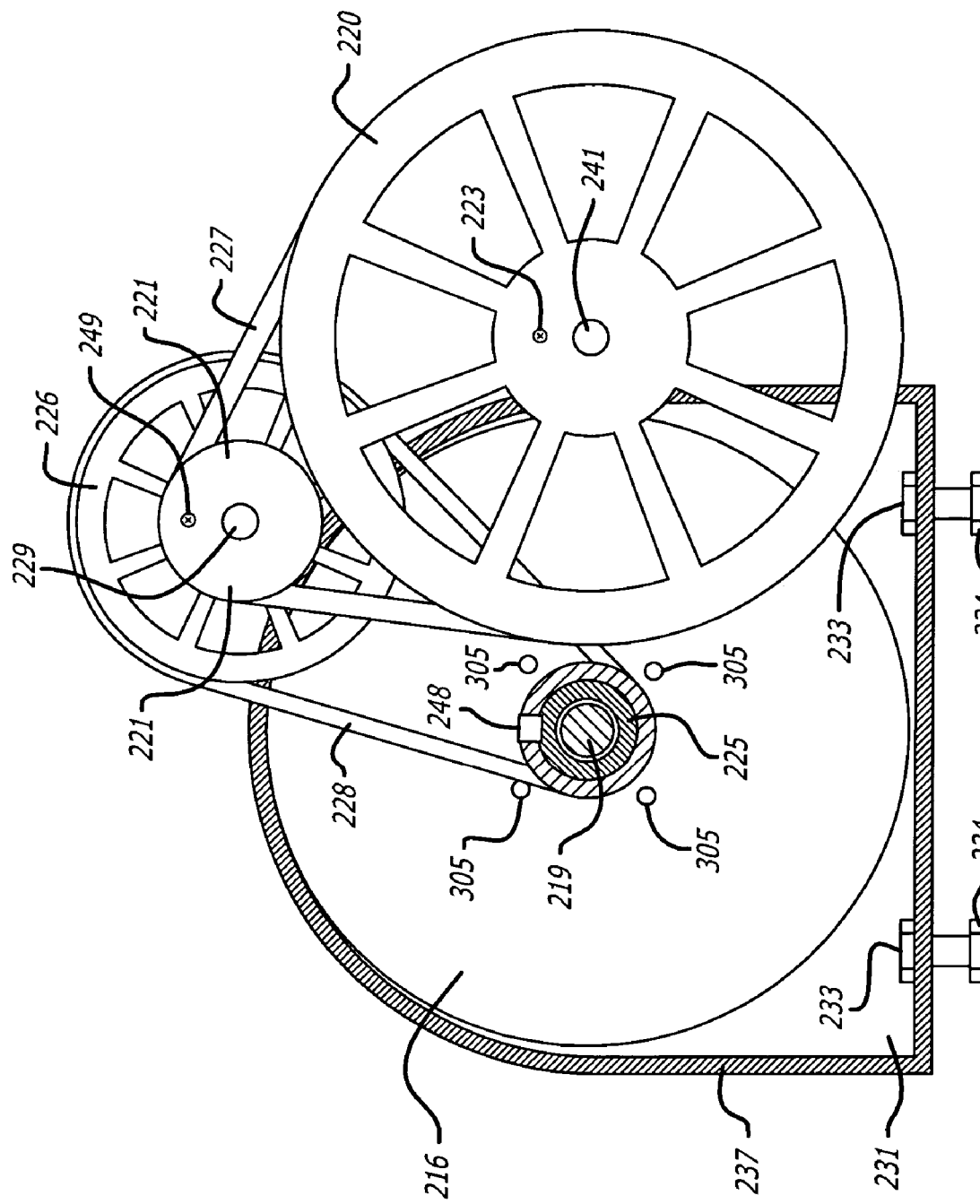
FIG. 20 is a side plan view of a drive system and speed differential of the further alternative exemplary device in the exemplary PMG embodiment of the present invention.

Continuing with reference to FIG. 18, in the exemplary PMG assembly 300, the stator 231, encased in the aluminum stator casing 237, is bolted using bolts 233 to bolt the casing 237 to an aluminum framework casing floor panel 230 (See also, FIG. 20). Ends 232a of the coils 232 are attached to block connectors 240 which are in turn connected to bridge rectifiers 239.

With reference to FIG. 20, a first pulley 225, such as a one-and-one-half inch (1½") V-belt pulley 225, is attached to one exposed end of shaft 219. First pulley 225 is set in place on the exposed end of shaft 219 using a set screw 248. Much of the rest of the further alternative exemplary device is similar in operation to the exemplary embodiment and is described only in overview.

First V-belt pulley 225 is connected with a first V-belt 228 to a second V-belt pulley 226. In the exemplary PMG embodiment, second V-belt pulley 226 measures approximately seven inches (7") in diameter. A third pulley 221 is connected to V-belt pulley 226 via an upper shaft 229. In the exemplary PMG embodiment, third V-belt pulley 221 measures approximately three inches (3") in diameter.

Third V-belt pulley 221 is connected via a second V-belt 227 to a fourth V-belt pulley wheel 220. In the exemplary PMG embodiment, fourth V-belt pulley 220 measures approximately 12 inches (12") in diameter. In the exemplary PMG embodiment, fourth V-belt pulley 220 is attached to a main pedal drive shaft 241. In the exemplary PMG embodiment, main pedal drive shaft 241 is approximately three-quarters of an inch (¾") in diameter and is milled to accommodate fourth V-belt pulley 220, a set screw 223, and a pedal armature 350.

Figure 37:
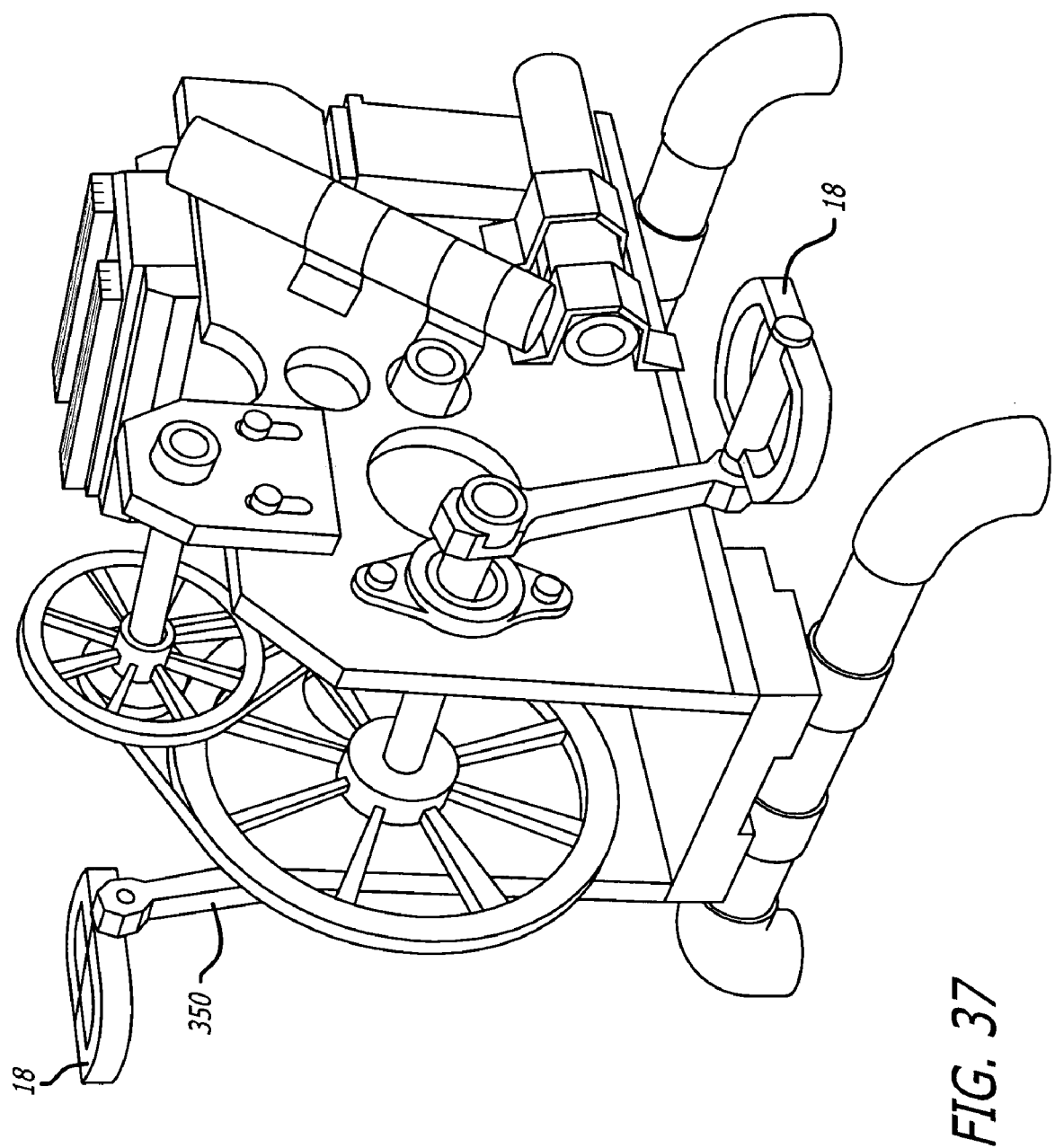
FIG. 37 is a perspective view of a foot/hand pedal operable device of the exemplary PMG embodiment of the present invention.

The further exemplary embodiment of the present invention may be operated by attaching foot pedals (or hand pedals) 18 to the pedal armature 350. FIG. 37 is a perspective view of a foot/hand pedal operable device of the further exemplary embodiment of the present invention.

Figure 19:
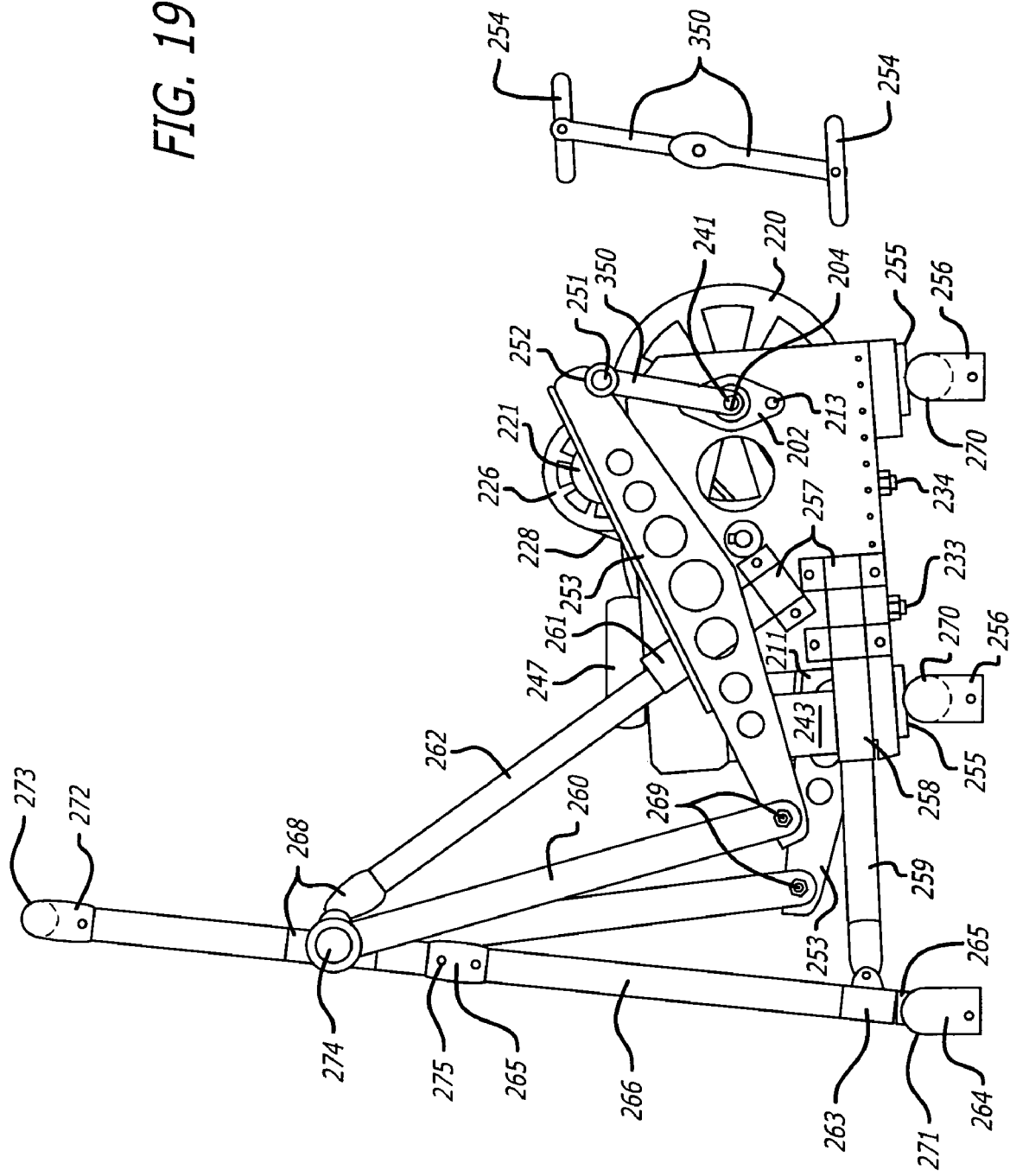
FIG. 19 is a side plan view of an assembled exemplary PMG embodiment of the present invention.
Figure 35:
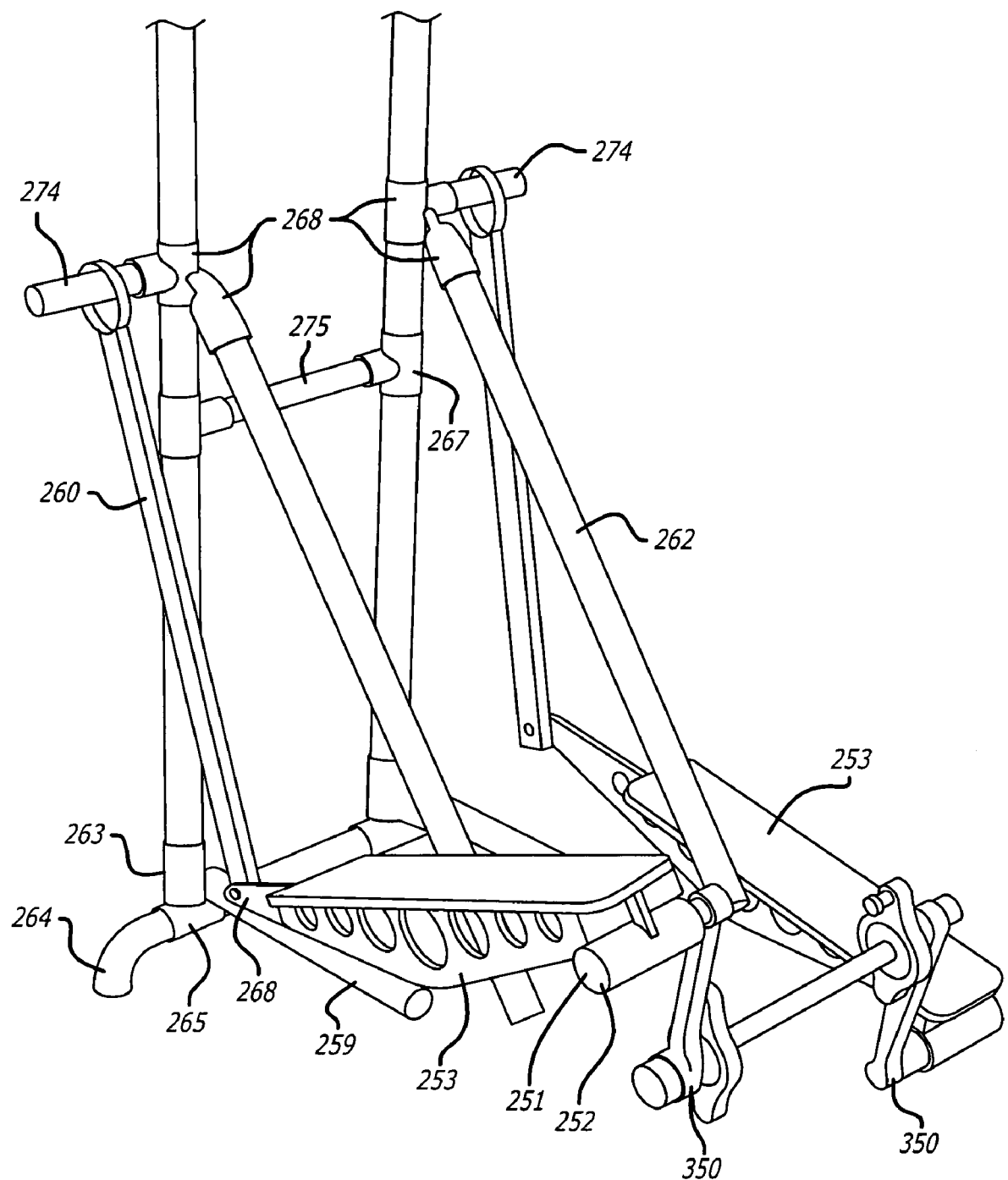
FIG. 35 is a perspective view of an elliptical ski/stair-stepper pedal framework of the exemplary PMG embodiment of the present invention.
Figure 36:
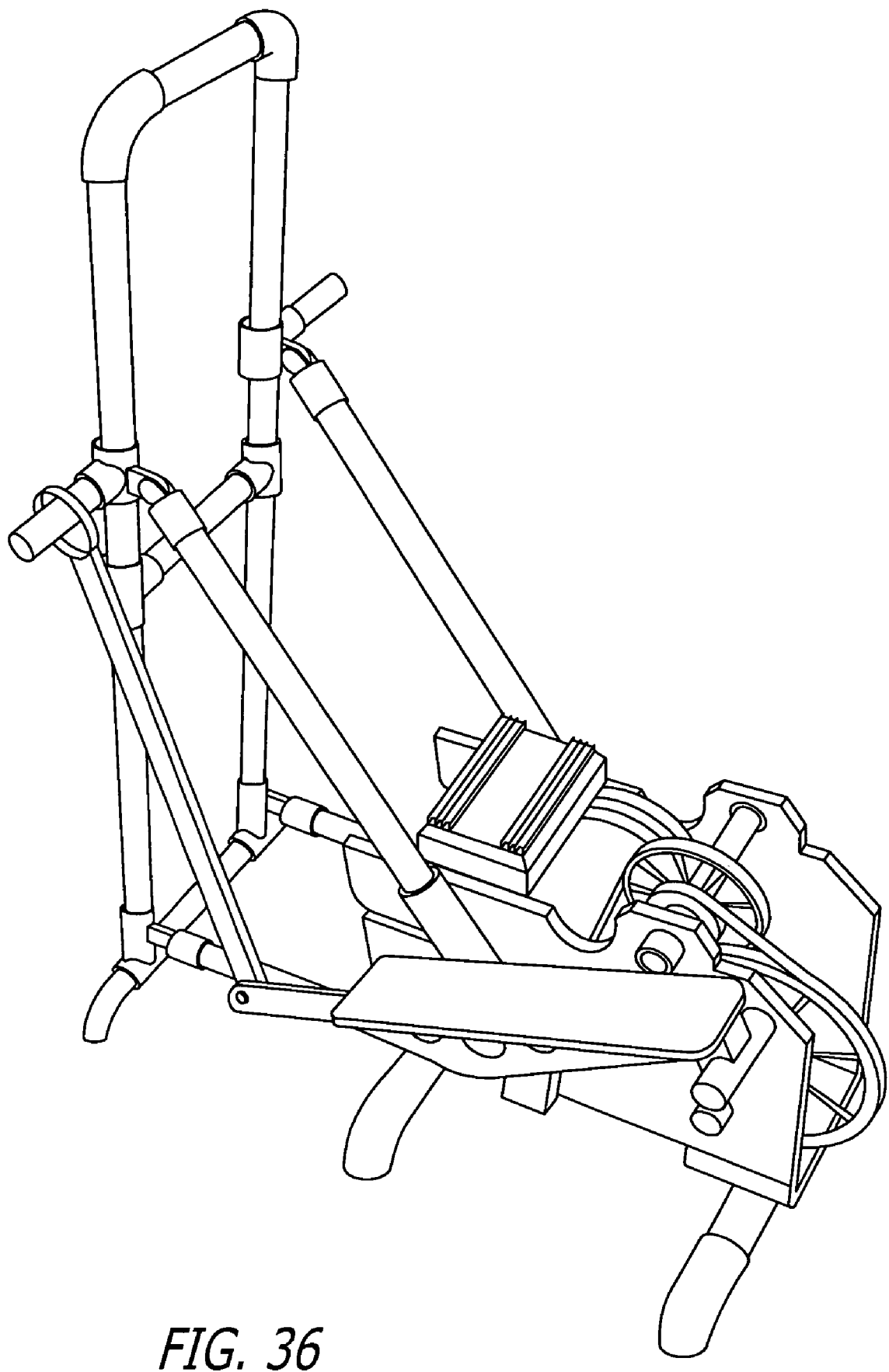
FIG. 36 is a perspective view of an elliptical ski/stair-stepper pedal operable device of the exemplary PMG embodiment of the present invention.

With reference to FIGS. 19 and 35, the further exemplary embodiment of the present invention may also be operated by attaching elliptical ski/stair-stepper pedals 253 to the pedal armature 350. FIGS. 19 and 35 depict elliptical ski/stair-stepper pedals 253 connected to respective pedal armatures 350. As depicted in FIGS. 19 and 35, an elliptical ski/stair-stepper pedal 253 is further connected to a pivot speedrail fitting 268 with 3 points of attachment which is in turn connected to a ring-welded steel swing bar 260. The ring-welded steel swing bar 260 is attached to a vertical bar 274 for stepper steps. FIGS. 35 and 36 show perspective views of an elliptical ski/stair-stepper pedal operable device of the further exemplary embodiment of the present invention.

A partial parts list for the exemplary PMG embodiment is provided below. The element numbers (also referred to herein as a part number, e.g., element 201 may be alternatively referred to as "part 201" or "Part 201") listed below will be referenced in one of FIGS. 18 through 39, although the majority of the parts listed below can be viewed in FIG. 18. In view of the Figures and the partial parts list, someone with ordinary skill in the art will understand assembly of the entire device.

Partial Parts List for Exemplary PMG Embodiment
- 201 ¼" aluminum framework casing—machined to accept all component parts (2 each per unit (includes both 201 and 201')).
- 202 ¾" flush pillowblock (2 each per unit). Holds Part 203 that keys into Part 202.
- 203 ¾" I.D. (interior diameter) bearing to fit Part 202 (2 each per unit)
- 204 ¾" I.D. stop collar with set screw (Part 205) (2 each per unit) 205 Set screw for 204.

206 ¾" I.D. bearing with stop ring (2 each per unit). Keys into Part 219.
207 ¾" I.D. stop collar for Part 206.
208 ¾" I.D. bearing with stop ring (2 each per unit). Keys into Part 212.
209 ¾" stop collar for Part 208 (2 each per unit). 210 Set screw for Part 208 stop collar (1 each per stop collar).
211 Set screw for Part 207 stop collar (1 each per stop collar).
212 Adjustable ¼" aluminum bearing plate to house rod for Parts 221, 226, and 229
213 ¼"×1-¼" fine thread bolts and ¼" nyloc nut (element 250).
214 ditto 213 above.
215 ¼"×3" fine thread bolts and nyloc nuts.
216 ¼"×12" steel plate with ¾" stop collar welded dead center.
217 High-temperature epoxy casting housing for Part 218 magnets.
218 ½"×1-½" high-quality neodymium magnets.
219 ¾" C.R. (cold rolled) steel permanent magnet generator (PMG) shaft.
220 12" V-belt pulley.
221 3" V-belt pulley.
222 Set screw for Part 221.
223 Set screw for Part 220.
224 Set screw for Part 216.
225 1-½" V-belt pulley.
226 7" V-belt pulley.
227 V-belt for Parts 220 and 221 (17400).
228 V-belt for Parts 226 and 225 (17313).
229 ¾" C.R. steel upper shaft.
230 ¼" aluminum framework casing—floor panel.
231 High-temperature epoxy encasement.
232 8 coils at 200 winds at 16-gauge coated magnet wires—PMG coils/electrical coils.
233 ¼"×1" bolts for mounting stator framework (2 for stator).
234 ¼" nuts for Part 233.
235 1" riser block.
236 2-¼"×¹⁄₁₆" thick×⅜" I.D. stand off/spacer tubing.
237 1"×⅛" aluminum stator casing (to hold Part 231+232).
238 ½" thick electrical block connector including bridge rectifiers mounting plates.
239 (4) 12-volt bridge rectifiers.
240 (1) 8 pairs of electrical block connectors.
241 ¾" diameter main pedal drive shaft (milled to accommodate Parts 220, 350, and 204).
242 ¼" aluminum battery base.
243 LA12150 12-volt mini lead-acid battery.
244 ¾" thick neoprene battery bumpers.
245 Battery retaining strap.
246 Mounting plate for 12-volt/110 200-watt inverter.
247 12 DC volt/110 AC 200-watt power inverter.
248 Set screw for Part 225.
249 Set screw for Part 226.
250 ¼" nyloc nut
251 ⅜"×6" hardened bolt with nut plus lockwashers.
252 ⅜" I.D.×1" O.D. (outer diameter) bearings to hold Part 251 (2 each per side).
253 StairStepper Step (reinforced) (2 per unit).
254 Foot pedals for pedal mode.
255 1-½" horizontal speedrail flush fitting (4 per unit).
256 1-¼" I.D.×90-degree speedrail fitting (4 per unit) footings.
257 1" I.D.×¹⁄₁₆" galvanized pipe straps (8 per unit).
258 1" O.D.×¾" I.D. aluminum tube (housing for lower telescopic structure of StairStepper mode framework with set screw (2 per unit).
259 ¾" O.D. lower support StairStepper framework (2 per unit) (fits into Part 258).
260 1-½"×⅛" steel swing bar for stepper steps. 1-¼" ring welded to top.
261 1" O.D.×¾" I.D. aluminum tube (housing for upper telescopic structure of StairStepper mode framework with set screw (2 per unit).
262 ¾" O.D. upper support StairStepper framework (2 per unit—fits into Part 261)
263 ¾" I.D. pivot speedrail fitting with 2 points of attachment.
264 ¾" I.D.×90-degree elbow speedrail fitting (stepper framework base feet)
265 ¾" I.D.×"T" speedrail fitting.
266 ¾" O.D. aluminum tube—vertical stepper framework.
268 ¾" I.D. pivot speedrail fitting with 3 points of attachment
269 ¼"×1-¼" hardened bolt—stepper elbow joint (attaches Part 253 to Part 260).
270 1-¼" O.D. aluminum tube—rear+mid unit "leg" support/horizontal stabilization.
271 ¾" O.D. aluminum tube—front base StairStepper horizontal stabilization
272 ¾" I.D.×90-degree elbow speedrail—top, stepper handhold.
273 ¾" O.D. aluminum tube—handhold bar.
274 ¾" O.D. steel tube with stop (main vertical connection for Part 260).
275 ¾" O.D. aluminum tube for Horizontal stepper frame stabilization.
330 secondary 12 volt battery
333 battery isolator/regulator
345 110/120 AC/DC converter
350 Pedal armature FIG. 19 is a side plan view of an assembled exemplary PMG embodiment of the present invention showing the supportive framework of the exemplary PMG device. As depicted in FIG. 19, a reinforced StairStepper Step 253 is provided, one on each side of the unit. As an alternative to StairStepper Step 253, the exemplary PMG embodiment is provided with alternative operational means in the form of foot pedals 254 for pedal mode operation. Either the foot pedals 254, or the StairStepper Step 253, can be attached to pedal armature 350. One pedal armature 350 is provided on each side of the device, attached to either end of main pedal drive shaft 241.

As depicted in FIG. 19, the exemplary supporting framework of the exemplary PMG device comprises among other things, horizontal speedrail flush fittings 255 (4 per unit). The exemplary supporting framework of the exemplary PMG device further comprises ninety-degree speedrail fitting footings 256 (4 per unit). Galvanized pipe straps 257 (8 per unit) are used to reinforce various connections. The exemplary supporting framework of the exemplary PMG device further comprises aluminum tubing 258 (2 per unit) (with set screw) as housing for lower telescopic structure components of the StairStepper mode framework. The exemplary supporting framework of the exemplary PMG device further comprises a lower support StairStepper framework 259 (2 per unit) that fits into aluminum tubing 258. The exemplary supporting framework of the exemplary PMG device further comprises steel swing bar 260 with a one and one-quarter inch ring welded to top for stepper steps. The exemplary supporting framework of the exemplary PMG device further comprises aluminum tube 261 (2 per unit) (with set screw) as housing for upper telescopic structure of StairStepper mode framework. The exemplary supporting framework of the exemplary PMG device further comprises upper support StairStepper framework 262 (2 per unit) for fitting into aluminum tube 261. The exemplary supporting framework of the exemplary PMG device further comprises pivot speedrail fitting 263 with 2 points of attachment and ninety-degree elbow speedrail fitting 264 as stepper framework base feet.

As depicted in FIG. 19, the exemplary supporting framework of the exemplary PMG device further comprises a "T" speedrail fitting 265, aluminum tube 266 as vertical stepper framework, and pivot speedrail fitting 268 with 3 points of attachment. The exemplary supporting framework of the exemplary PMG device further comprises hardened bolt 269 stepper elbow joint (attaches 253 to 260). The exemplary supporting framework of the exemplary PMG device further comprises aluminum tube rear-device and mid-device "leg" support/horizontal stabilization units 270. The exemplary supporting framework of the exemplary PMG device further comprises aluminum tube front base StairStepper horizontal stabilization unit 271. The exemplary supporting framework of the exemplary PMG device further comprises ninety-degree elbow speedrail 272 as a top, stepper handhold. The exemplary supporting framework of the exemplary PMG device further comprises aluminum tube 273 as a handhold bar, steel tube 274 with stop as a main vertical connection for element 260, and aluminum tube 275 as a horizontal stepper frame stabilization.

Returning with reference to FIG. 18, and with reference to FIG. 20, as human power is applied to pedals (either foot pedals 18 (FIG. 37), or elliptical ski/stair-stepper pedals 253 (FIG. 36)), the main pedal drive shaft 241 will rotate, thereby causing fourth V-belt pulley 220 to rotate. As fourth V-belt pulley 220 rotates, V-belt 227 will cause third V-belt pulley 221 to rotate, causing rotation of second V-belt pulley 228 via upper shaft 229. As second V-belt pulley 228 rotates, first V-belt pulley 225 will rotate via V-belt 228. As first V-belt pulley 225 rotates, PMG shaft 219 will rotate, causing rotation of the exemplary rotor/steel plate assemblies 309 (FIG. 18).

With reference to FIG. 18, as the rotors 217 of the exemplary rotor/steel plate assemblies 309 are rotated, the counter-posed magnets become aligned (although in normal operation, only momentarily) with a respective coil 232 so that magnetic flux passes from a magnet, (e.g., North-pole faced-up magnets 218-1, 218-3, 218-5 and 218-7 respectively) on one rotor, e.g., 217*a*, to the counter-posed magnet (e.g., South-pole faced-up magnets 218-10, 218-12, 218-14 and 218-16 respectively) on the other rotor, e.g., 217*b*, through the respective coil 232; and from North-pole faced up magnets 218-11, 218-13, 218-15 and 218-17 on, e.g., rotor 217*b*, to the counter-posed South-pole faced-up magnets 218-2, 218-4, 218-6 and 218-8 on, e.g., rotor 217*a*. As the rotors continue to turn, the magnetic flux passing from one rotor, e.g., 217*a*, to the other rotor, e.g., 217*b* through a particular coil 232, alternates so that the next pair of counter-posed magnets that are aligned with that coil 232 cause an alternate magnetic flux to pass through the coil 232. The alternating magnetic flux moving through the respective coils 232 of the stator 231 produces electric power in the form of alternating current.

Figure 38:
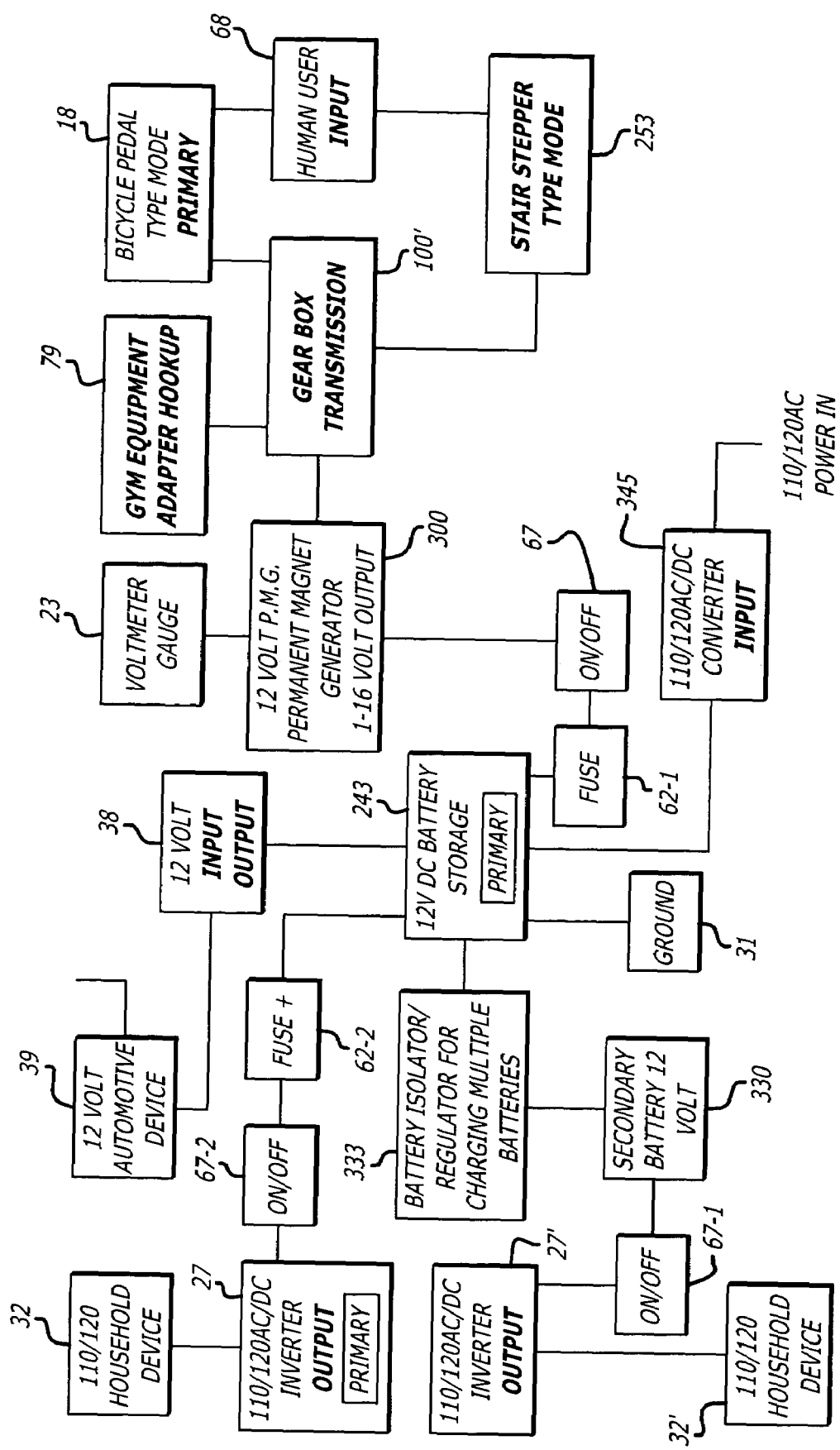
FIG. 38 is a block diagram depicting exemplary electrical components in relation to physical components in the further alternative exemplary device in the exemplary PMG embodiment of the present invention.

FIG. 38 is a block diagram depicting exemplary electrical components in relation to physical components in the exemplary PMG device in the exemplary PMG embodiment of the present invention. As depicted in FIG. 38, the gear-to-gear transmission assembly/gear box transmission 100' can be driven by human user input 68 via either bicycle pedal (foot pedal) mode 18, or via stair stepper mode 253. As depicted in FIG. 38, the gear box transmission could be connectable to a gym equipment adapter 79 as was previously described above.

As depicted in FIG. 38, the gear-to-gear transmission assembly/gear box transmission 100' is connected to the permanent magnet generator assembly 300, which is in turn connected to on/off switch 67, which is in turn connected, via a fuse 62-1, to battery 243. In the PMG embodiment, battery 243 is a 12-volt mini lead-acid battery. As depicted in FIG. 38, battery 243 is a primary storage of the power generated by operating the PMG assembly 300. Battery 243 is connected to a ground 31. Battery 243 is also connectable to a device operable with 12-volt power 38, such as a 12-volt automotive device 39. Battery 243 is connected to a fuse 62-2, which is in turn connected, via an on/off switch 67-2, to a first 110/120 AC/DC inverter 27 that can convert the 12-volt DC energy to 110/120 AC power for supplying power to a device that operates using 110/120 AC power, such as a household device 32. Battery 243 is also connected, or connectable, to a battery isolator/regulator 333 for charging multiple batteries such as a secondary battery 330. The secondary battery 330 could also be connected, via an on/off switch 67-1, to a second 110/120 AC/DC inverter 27' that can convert the 12-volt DC energy to 110/120 AC power for supplying power to a device that operates using 110/120 AC power, such as a household device 32'.

Figure 39:
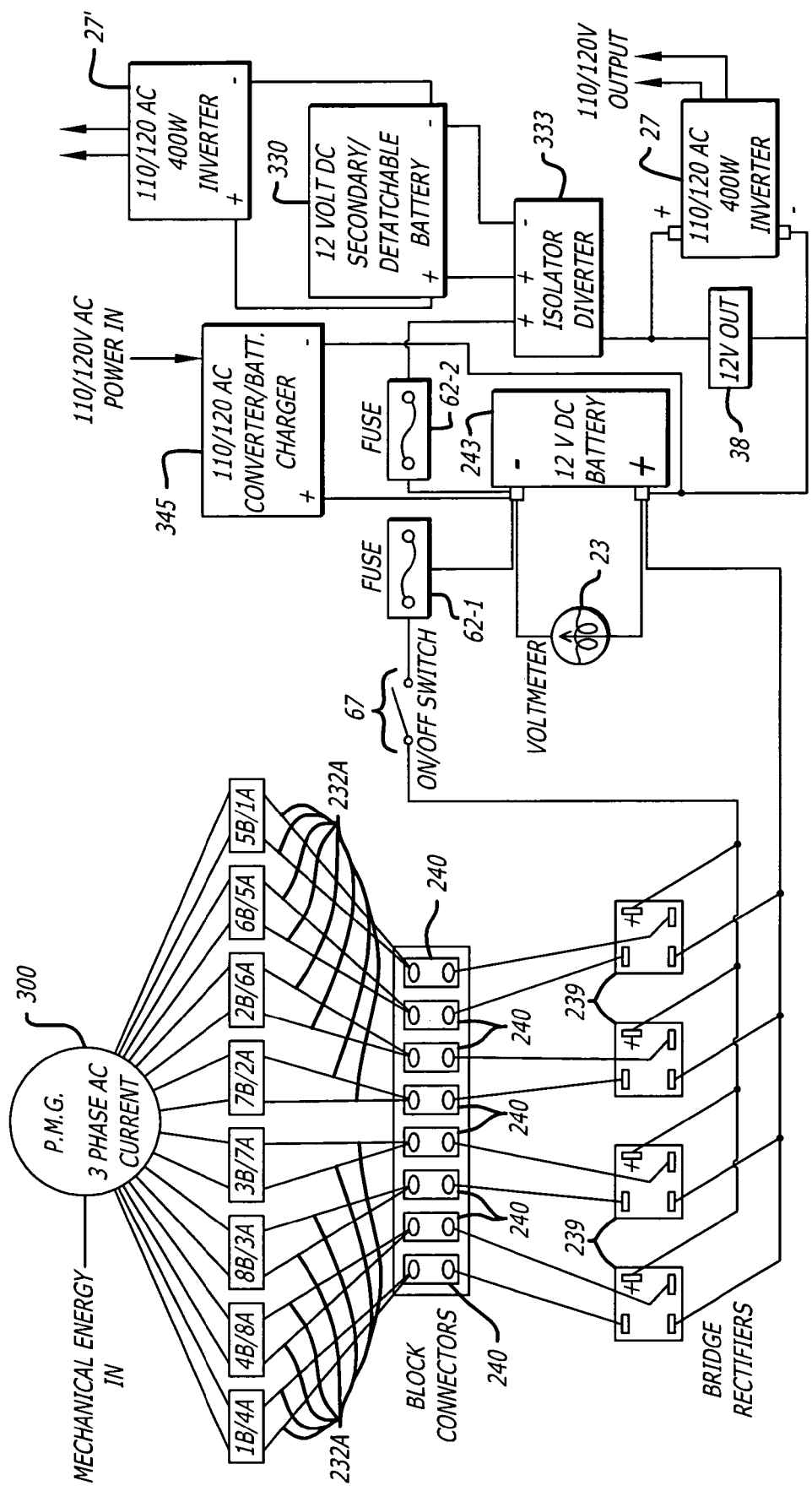
FIG. 39 is a schematic diagram depicting exemplary connections between the exemplary PMG assembly and various electrical components of the further alternative exemplary device in the exemplary PMG embodiment of the present invention.

FIG. 39 is a schematic diagram depicting exemplary connections between the exemplary PMG assembly 300 and various electrical components of the exemplary PMG device in the exemplary PMG embodiment of the present invention. As depicted in FIG. 39, ends 232*a* of the coils (element 232 in, e.g., FIG. 18) are attached to block connectors 240 which are in turn connected to bridge rectifiers 239. The alternating current generated by operating the permanent magnet generator assembly 300 is changed via the bridge rectifiers 239 into 'direct current' (DC) for charging a 12-volt battery 243. The bridge rectifiers 239 are connected to the battery 243 via an on/off switch 67, and a fuse 62-1. A voltmeter 23 is provided to measure the charge to battery 243. Battery 243 is connected to a first 110/120 AC inverter 27 (such as a 400 W inverter) to run devices that are operable via 110/120 AC power. An isolator diverter 333 is connected, or connectable, to battery 243 via fuse 62-2. Isolator diverter 333, when connected to charged battery 243, can be used to charge secondary batteries, e.g., 330, which can in turn be connected to a second 110/120 AC inverter 27' (such as a 400 W inverter) to run devices that are operable via 110/120 AC power. As depicted in FIG. 38, a converter 345 could be connected to battery 243 to convert input 110/120 AC current to 12-volt direct current to allow input to charge battery 243.

As compared to the exemplary embodiment which required that the alternator pulley wheel must rotate about 1100 times per minute in order to generate electricity, the exemplary PMG embodiment with the exemplary PMG assembly 300 recognizes electricity generation with very low RPMs. Indeed, the exemplary PMG embodiment with the exemplary PMG assembly 300 recognizes electricity generation following early rotation of the rotors.

Other features of the invention are implicit in the above-provided description and/or are depicted and/or implicit in the accompanying Figures.

Facsimile Reproduction of Copyright Material

A portion of the disclosure of this patent document contains material which is subject to copyright protection by the copyright owner, Linda Vasilovich, her successors and assigns. The copyright owner has no objection to the facsimile reproduction by anyone of the patent document or the patent disclosure, as it appears in the Patent and Trademark Office patent file or records, but otherwise reserves all copyright rights whatsoever.

ILLUSTRATIVE EMBODIMENTS

Although this invention has been described in certain specific embodiments, many additional modifications and variations would be apparent to those skilled in the art. It is, therefore, to be understood that this invention may be practiced otherwise than as specifically described. Moreover, to those skilled in the various arts, the invention itself herein will suggest solutions to other tasks and adaptations for other applications. Thus, the embodiments of the invention described herein should be considered in all respects as illustrative and not restrictive, the scope of the invention to be determined by the appended claims and their equivalents rather than the foregoing description.

What is claimed is:

1. A device for converting human power to electrical power, said device comprising:
    a battery;
    a first gear wheel comprising a center and an opening in the center;
    a first axle, said first axle disposed through the opening in the center of the first gear wheel;
    a first pedal mounted on a first pedal arm and a second pedal mounted on a second pedal arm, each pedal arm mounted on opposing ends of the first axle;
    a second gear wheel interconnected to the first gear wheel with a first pulley belt;
    a permanent magnet generator assembly comprising:
        a stator assembly comprising a stator casing and a stator, wherein the stator comprises non-magnetic material that substantially does not conduct electricity, wherein the stator further comprises a plurality of electric wire coils imbedded in the non-magnetic material of the stator, wherein the electric wire coils are connected to the battery, wherein the stator further comprises a hole formed at a point that is substantially central to the plurality of electric wire coils, wherein the stator casing supports the stator, and wherein the stator casing is fastened to an anchoring framework;
        a first rotor and a second rotor, wherein the first rotor and the second rotor each comprises a respective substantially round, substantially disk-shaped wheel, and wherein each of the first and second rotors comprises non-magnetic material that substantially does not conduct electricity;
        the first rotor comprising a first center hole and a first plurality of magnets imbedded in a respective first side of the non-magnetic material of the first rotor, wherein each magnet of the first plurality of magnets is imbedded at a first radial distance from the first center hole in a substantially circular pattern around the first center hole, wherein each magnet is imbedded in the non-magnetic material of the first rotor exposing a magnetic pole of the respective magnet on the respective first side of the first rotor, and wherein each magnet of the first plurality of magnets is imbedded so that the magnet exposes a magnetic pole of alternating charge in relation to an exposed magnetic pole of an immediately preceding magnet;
        the second rotor comprising a second center hole and a second plurality of magnets imbedded in a respective first side of the non-magnetic material of the second rotor, wherein each magnet of the second plurality of magnets is imbedded at a first radial distance from the second center hole in a substantially circular pattern around the second center hole, wherein each magnet is imbedded in the non-magnetic material of the second rotor exposing a magnetic pole of the respective magnet on the respective first side of the second rotor, and wherein each magnet of the second plurality of magnets is imbedded so that the magnet exposes a magnetic pole of alternating charge in relation to an exposed magnetic pole of an immediately preceding magnet;
        a shaft comprising a first end and a second end, wherein the shaft passes through the first center hole of the first rotor, through the hole in the stator, and through the second center hold of the second rotor, wherein the first rotor is mounted on the shaft on a first side of the stator such that the respective first side of the non-magnetic material of the first rotor faces the stator, wherein the second rotor is mounted on the shaft on a second side of the stator such that the respective first side of the non-magnetic material of the second rotor faces the stator, and wherein the first rotor is connected to the second rotor through the hole in the stator such that the exposed magnetic poles of the magnets imbedded in the first rotor are aligned with magnets imbedded in the second rotor and such that the exposed pole of each magnet on the first rotor is aligned with a magnet on the second rotor that has an exposed pole with an opposite charge;
        a first rotatable anchoring means, wherein said first rotatable anchoring means rotatably connects the first end of the shaft to a first stationary framework unit; and
        a second rotatable anchoring means, wherein said second rotatable anchoring means rotatably connects the second end of the shaft to a second stationary framework unit; and
    a second pulley belt, the pulley belt interconnecting one of the first end or the second end of the shaft to the second gear wheel.

2. A device for converting human power to electrical power, said device comprising:
    an alternator;
    an alternator pulley wheel mounted on the alternator;
    a battery for storing direct current electrical energy;
    an inverter for converting direct current electrical energy into alternating current electrical energy;
    a manually-operated first gear wheel comprising a center opening;
    a second gear wheel, a third gear wheel, a fourth gear wheel, a fifth gear wheel, and a sixth gear wheel;
    a first axle disposed through the manually-operated first gear wheel center opening;
    a second axle disposed through a center opening in the second gear wheel and through a center opening in the third gear wheel such that the second gear wheel and the third gear wheel are mounted on the second axle;
    a third axle disposed through a center opening in the fourth gear wheel, and through a center opening in the fifth gear wheel, and through a center opening in the sixth gear wheel such that the fifth gear wheel is mounted on the third axle between the sixth gear wheel and the fourth gear wheel;

a first manual-operation means mounted to a first end of the first axle and a second manual-operation means mounted to a second end of the first axle;

a first interconnecting means interconnectably mounted to the manually-operated first gear wheel, said first interconnecting means interconnecting the manually-operated first gear wheel to the second gear wheel;

a second interconnecting means interconnectably mounted to the third gear wheel, said second interconnecting means interconnecting the third gear wheel to the fourth gear wheel; and a third interconnecting means interconnectably mounted to the sixth gear wheel, interconnecting the sixth gear wheel to the alternator pulley wheel.

3. A device for converting human power to electrical power, said device further comprising:

a plurality of pear wheels interconnected with a plurality of interconnection means;

a first axle, said first axle disposed through an opening in a center of a first gear wheel of the plurality of gear wheels;

a first pedal mounted on a first pedal arm and a second pedal mounted on a second pedal arm, each pedal arm mounted on opposing ends of the first axle;

a second gear wheel of the plurality of gear wheels interconnected to the first gear wheel with a first interconnection means of the plurality of interconnection means;

a permanent magnet generator assembly comprising:

a stator, wherein said stator comprises a structure that comprises non-magnetic material that substantially does not conduct electricity, wherein said stator further comprises a plurality of electric wire coils imbedded in said non-magnetic material of the stator, and wherein said stator comprises a hole formed at a point that is substantially central to the plurality of electric wire coils;

a stator casing, wherein said stator casing supports said stator;

a first rotor and a second rotor, wherein the first rotor and the second rotor each comprises a round disk-shaped wheel, wherein each of said first and second rotors comprises a structure that comprises non-magnetic material that substantially does not conduct electricity, and wherein each of said first and second rotors comprises a plurality of magnets imbedded in a first side of the non-magnetic material of the respective first and second rotor;

a shaft having a first end and a second end, wherein the first end of the shaft is inserted in a hole in the first rotor, wherein the second end of the shaft is inserted through the hole in the stator, wherein the second end of the shaft is inserted through a hole in the second rotor, wherein the first side of the non-magnetic material of the first rotor faces the stator, and wherein the first side of the non-magnetic material of the second rotor faces the stator;

a first rotatable anchoring means, wherein said first rotatable anchoring means rotatably connects the first end of the shaft to a first stationary framework unit;

a second rotatable anchoring means, wherein said second rotatable anchoring means rotatably connects the second end of the shaft to a second stationary framework unit; and a shaft turning means, wherein said shaft turning means is connected to one of the first end or the second end of the shaft.

4. A device for converting human power to electrical power, said device comprising:

a framework;

a battery;

a shaft;

a first gear wheel comprising a center and an opening in the center;

a first axle, said first axle disposed through the opening in the center of the first gear wheel;

a first pedal mounted on a first pedal arm and a second pedal mounted on a second pedal arm, each pedal arm mounted on opposing ends of the first axle;

a second gear wheel interconnected to the first gear wheel with a first pulley belt; and a permanent magnet generator assembly mounted on the shaft and interconnected to the second gear wheel with a second pulley belt, the permanent magnet generator assembly comprising:

a first structure comprising a first planar side and a second planar side, the first structure further comprising a plurality of substantially circular structures mounted in a substantially circular pattern equidistant from a first point in the first structure, each of the substantially circular structures of the plurality of substantially circular structures comprising a material adapted for conducting electricity, wherein each of the substantially circular structures of the plurality of substantially circular structures is connected to the battery, wherein the first structure is connected to the framework, and wherein the first structure is mounted on the shaft;

a first rotatable structure comprising a first rotatable structure planar side and a second rotatable structure planar side, and further comprising a first plurality of permanent magnets mounted in a substantially circular pattern equidistant from a second point in the first rotatable structure, such that each permanent magnet of the first plurality of permanent magnets comprises an exposed pole on the first rotatable structure planar side of the first rotatable structure, and such that the exposed pole of each permanent magnet of the first plurality of permanent magnets comprises a first charge that is opposite a second charge of each adjacent permanent magnet, wherein the first rotatable structure is mounted on the shaft so that the first rotatable structure planar side faces the first planar side of the first structure; and a second rotatable structure comprising a third rotatable structure planar side and a fourth rotatable structure planar side, and further comprising a second plurality of permanent magnets mounted in a substantially circular pattern equidistant from a third point in the second rotatable structure, such that each permanent magnet of the second plurality of permanent magnets comprises an exposed pole on the third rotatable structure planar side of the second rotatable structure, and such that the exposed pole of each permanent magnet of the second plurality of permanent magnets comprises a third charge that is opposite a fourth charge of each adjacent permanent magnet, wherein the second rotatable structure is mounted on the shaft so that the third rotatable structure planar side faces the second planar side of the first structure, and wherein the first rotatable structure is connected to the second rotatable structure so that the each permanent magnet of the first plurality of magnets is aligned with a permanent magnet of opposing pole charge of the second plurality of magnets.

5. A device for converting human power to electrical power, said device comprising:
   a framework;
   a battery;
   a shaft;
   a first gear wheel comprising a center and an opening in the center;
   a first axle, said first axle disposed through the opening in the center of the first gear wheel;
   a first pedal mounted on a first pedal arm and a second pedal mounted on a second pedal arm, each pedal arm mounted on opposing ends of the first axle;
   a second gear wheel interconnected to the first gear wheel with a first pulley belt; and
   a permanent magnet generator assembly mounted on the shaft and interconnected to the second gear wheel with a second pulley belt, the permanent magnet generator assembly comprising:
      a first structure comprising a plurality of substantially circular structures mounted in a substantially circular pattern equidistant from a first point in the first structure, each of the substantially circular structures of the plurality of substantially circular structures comprising a material adapted for conducting electricity, wherein each of the substantially circular structures of the plurality of substantially circular structures is connected to the battery, wherein the first structure is connected to the framework, and wherein the first structure is mounted on the shaft; and
      two rotatable structures mounted on the shaft opposing each other on each side of the first structure, each rotatable structure comprising a respective plurality of permanent magnets mounted in a substantially circular pattern substantially equidistant from a respective center point in the respective rotatable structure such that the mounted permanent magnets expose alternating exposed magnetic poles, such that the alternating exposed magnetic poles of the respective permanent magnets mounted on one of the respective rotatable structures are aligned with, and counterposed in magnetic polarity to the alternating exposed magnetic poles of the respective permanent magnets mounted on the respective opposing rotatable structure.

* * * * *